United States Patent
Arikuma et al.

(10) Patent No.: US 9,141,727 B2
(45) Date of Patent: Sep. 22, 2015

(54) INFORMATION SEARCH DEVICE, INFORMATION SEARCH METHOD, COMPUTER PROGRAM, AND DATA STRUCTURE

(75) Inventors: Takeshi Arikuma, Tokyo (JP); Nobuhisa Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 408 days.

(21) Appl. No.: 13/642,890

(22) PCT Filed: May 12, 2011

(86) PCT No.: PCT/JP2011/002641
§ 371 (c)(1),
(2), (4) Date: Dec. 31, 2012

(87) PCT Pub. No.: WO2011/142134
PCT Pub. Date: Nov. 17, 2011

(65) Prior Publication Data
US 2013/0103693 A1   Apr. 25, 2013

(30) Foreign Application Priority Data
May 14, 2010   (JP) .................................. 2010-111940

(51) Int. Cl.
*G06F 17/30* (2006.01)
(52) U.S. Cl.
CPC .... *G06F 17/30958* (2013.01); *G06F 17/30014* (2013.01); *G06F 17/30321* (2013.01); *G06F 17/30946* (2013.01)
(58) Field of Classification Search
None
See application file for complete search history.

(56) References Cited

U.S. PATENT DOCUMENTS

| | | | | |
|---|---|---|---|---|
| 7,139,746 | B2 * | 11/2006 | Shin et al. | 707/736 |
| 7,162,485 | B2 * | 1/2007 | Gottlob et al. | 707/769 |
| 7,849,091 | B1 * | 12/2010 | Cho et al. | 707/743 |
| 8,949,455 | B2 * | 2/2015 | Idicula et al. | 709/238 |
| 2003/0163285 | A1 * | 8/2003 | Nakamura et al. | 702/179 |

(Continued)

FOREIGN PATENT DOCUMENTS

| | | |
|---|---|---|
| CN | 1965316 A | 5/2007 |
| CN | 101655862 A | 2/2010 |

(Continued)

OTHER PUBLICATIONS

Akiyoshi Matono, et al., "A Path-based Relational RDF Database," ADC '05: Proceedings of the 16th database conference, 2005, pp. 95-103.

(Continued)

*Primary Examiner* — Richard Bowen
(74) *Attorney, Agent, or Firm* — Sughrue Mion, PLLC

(57) ABSTRACT

An information search device includes: a path field generating part that, for each node, generates a path field in which paths with the node as an origin are connected; an index generating part that, for each element configuring graph structure information, generates a posting list as a list of information composed of a node having a path field including the element and location information representing a location where the element appears in the path field, and generates an index repository in which the element and the posting list are associated; a search path generating part that generates a search path representing a search condition; and a searching part that extracts a node having a path field satisfying an appearance sequence of elements included in the search path based on the location information of the posting list.

9 Claims, 18 Drawing Sheets

(56) References Cited

U.S. PATENT DOCUMENTS

| | | | |
|---|---|---|---|
| 2003/0233618 A1* | 12/2003 | Wan | 715/513 |
| 2004/0073541 A1* | 4/2004 | Lindblad et al. | 707/3 |
| 2004/0193607 A1* | 9/2004 | Kudo et al. | 707/9 |
| 2004/0205082 A1* | 10/2004 | Fontoura et al. | 707/101 |
| 2005/0203957 A1* | 9/2005 | Wang et al. | 707/104.1 |
| 2005/0257201 A1* | 11/2005 | Rose et al. | 717/136 |
| 2006/0064432 A1* | 3/2006 | Pettovello | 707/103 X |
| 2007/0112813 A1 | 5/2007 | Beyer et al. | |
| 2007/0136382 A1 | 6/2007 | Idicula et al. | |
| 2008/0016094 A1* | 1/2008 | Takano et al. | 707/101 |
| 2008/0059420 A1 | 3/2008 | Hsu et al. | |
| 2008/0120280 A1* | 5/2008 | Iijima et al. | 707/3 |
| 2008/0133473 A1 | 6/2008 | Broder et al. | |
| 2008/0222614 A1* | 9/2008 | Chilimbi et al. | 717/130 |
| 2009/0307186 A1* | 12/2009 | Hoshino et al. | 707/2 |
| 2011/0093485 A1* | 4/2011 | Chang et al. | 707/759 |

FOREIGN PATENT DOCUMENTS

| | | |
|---|---|---|
| CN | 101685444 A | 3/2010 |
| JP | 2001-34619 A | 2/2001 |
| JP | 2004-118543 A | 4/2004 |
| JP | 2006-313501 A | 11/2006 |
| JP | 2007-140713 A | 6/2007 |
| JP | 2009-258749 A | 11/2009 |

OTHER PUBLICATIONS

Communication dated Dec. 31, 2014 from the State Intellectual Property Office of the People's Republic of China in counterpart application No. 201180024041.9.

Communication dated Jul. 20, 2015 from the European Patent Office in counterpart application No. 11780393.2.

* cited by examiner

Fig.9

PATH INDEX

| TERM | RESOURCE <LOCATION> |
|---|---|
| THIS | e1<1,4,···>,c1<···>,p1<···>,a1<···>,a2<···>,b1<···> |
| type | e1<2,7,···>,c1<···>,p1<···>,a1<···>,a2<···>,b1<···> |
| hasClient | e1<5,10,···>,b1<···> |
| hasFamilyMember | e1<12,19,···>,c1<···>,b1<···> |
| hasInsurance | e1<21,30,···>,c1<···>,p1<···>,b1<···> |
| validUntil | e1<32,59>,c1<···>,p1<···>,a1<···>,a2<···>,b1<···> |
| isNonrefundable | e1<41,68>,c1<···>,p1<···>,a1<···>,a2<···>,b1<···> |
| Employee | e1<3>,b1<···> |
| Client | e1<8>,c1<···>,b1<···> |
| Person | e1<15>,c1<···>,p1<···>,b1<···> |
| Insurance | e1<24,51>,c1<···>,p1<···>,a1<···>,a2<···>,b1<···> |
| 2010/12/31 | e1<33>,c1<···>,p1<···>,a1<···>,b1<···> |
| 2015/12/31 | e1<60>,c1<···>,p1<···>,a2<···>,b1<···> |
| TRUE | e1<42>,c1<···>,p1<···>,a1<···>,b1<···> |
| FALSE | e1<69>,c1<···>,p1<···>,a2<···>,b1<···> |
| e1 | b1<···> |
| c1 | e1<6,11,···>,b1<···> |
| p1 | e1<13,20,···>,c1<···>,b1<···> |
| a1 | e1<22,31,···>,c1<···>,p1<···>,b1<···> |
| a2 | e1<49,58,···>,c1<···>,p1<···>,b1<···> |
| ... | ... |

Fig.10

Contact Index (a)
| TERM | RESOURCE |
|---|---|
| xxx@yyy.zzz.xx | e1 |
| ... | ... |

ValidUntil Index (b)
| TERM | RESOURCE |
|---|---|
| 2010/12/31 | a1,... |
| 2015/12/31 | a2,... |
| ... | ... | isNonrefundable Index (c)
| TERM | RESOURCE |
|---|---|
| TRUE | a1,... |
| FALSE | a2,... |
| ... | ... |

Fig.11 type Index

| TERM | RESOURCE |
|---|---|
| Employee | e1,... |
| Client | c1,... |
| Person | p1,... |
| Insurance | a1,a2,... |
| ... | ... |

SUBGRAPH TABLE

| RESOURCE ID | SUBGRAPH |
|---|---|
| c1 | <c1> <type> <Client>.<br><c1> <hasFamilyMember> <p1>. |
| e1 |  |
| ⋮ | ⋮ |

```
( INDEX GENERATION PROCESS )
            │
            ▼
  LOAD KNOWLEDGE INFORMATION      ~S11
          MODEL
            │
            ▼
  GENERATE PATH FIELD OF EACH     ~S12
          RESOURCE
            │
            ▼
     TOKENIZE PATH FIELD          ~S13
            │
            ▼
  REGISTER INTO INDEX REPOSITORY  ~S14
            │
            ▼
  REGISTER INTO MODEL DATA DB     ~S15
            │
            ▼
          ( END )
```

Fig.18

PATH FIELD OF RESOURCE e1

| PASS EXPRESSION |
|---|
| [b1][hasEmployee][THIS][type][Employee] |
| [b1][hasEmployee][THIS][hasClient][c1][type][Client] |
| [b1][hasEmployee][THIS][hasClient][c1][hasFamilyMember][p1][type][Person] |
| [b1][hasEmployee][THIS][hasClient][c1][hasFamilyMember][p1][hasInsurance][a1][type][Insurance] |
| [b1][hasEmployee][THIS][hasClient][c1][hasFamilyMember][p1][hasInsurance][a1][validUntil][2010/12/31] |
| [b1][hasEmployee][THIS][hasClient][c1][hasFamilyMember][p1][hasInsurance][a1][isNonrefundable][true] |
| [b1][hasEmployee][THIS][hasClient][c1][hasFamilyMember][p1][hasInsurance][a2][type][Insurance] |
| [b1][hasEmployee][THIS][hasClient][c1][hasFamilyMember][p1][hasInsurance][a2][validUntil][2015/12/31] |
| [b1][hasEmployee][THIS][hasClient][c1][hasFamilyMember][p1][hasInsurance][a2][isNonrefundable][false] |
| [b1][hasEmployee][THIS][hasClient][c1][contact][xxx@yyy.zzz.xx] |

Related Art   Fig.22

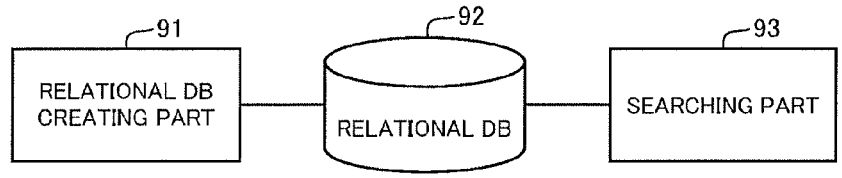

Related Art   Fig.23

| triple | | |
|---|---|---|
| subject | predicate | object |
| 'r1' | 'first' | 'Picasso' |
| 'r1' | 'last' | 'Pablo' |
| 'r1' | 'paints' | 'r2' |
| 'r1' | 'paints' | 'r3' |
| 'r2' | 'title' | 'Guernica ..' |
| 'r3' | 'title' | 'Les dem..' |
| 'r4' | 'first' | 'August' |
| 'r4' | 'last' | 'Rodin' |
| 'r4' | 'sculpts' | 'r5' |
| 'r5' | 'title' | 'The Thinker' |

| path | |
|---|---|
| pathID | pathexp |
| 1 | '' |
| 2 | '#first' |
| 3 | '#last' |
| 4 | '#paints' |
| 5 | '#title<#paints' |
| 6 | '#sculpts' |
| 7 | '#title<#sculpts' |

| class | | | |
|---|---|---|---|
| className | pre | post | depth |
| 'Literal' | 2 | 1 | 1 |
| 'Artist' | 3 | 4 | 1 |
| 'Sculptor' | 4 | 2 | 2 |
| 'Painter' | 5 | 3 | 2 |
| 'Artifact' | 6 | 7 | 1 |
| 'Sculpture' | 7 | 5 | 2 |
| 'Painting' | 8 | 6 | 2 |
| 'CommercialGoods' | 9 | 9 | 1 |
| 'Painting' | 10 | 8 | 2 |

| resource | | |
|---|---|---|
| resourceName | pathID | datatype |
| 'r1' | 1 | 0 |
| 'r2' | 4 | 0 |
| 'r3' | 4 | 0 |
| 'r4' | 1 | 0 |
| 'r5' | 6 | 0 |
| 'Picasso' | 2 | 1 |
| 'Pablo' | 3 | 1 |
| 'August' | 2 | 1 |
| 'Rodin' | 3 | 1 |
| 'Guernica ..' | 5 | 1 |
| 'Les demoi..' | 5 | 1 |
| 'The Thinker' | 7 | 1 |

| type | |
|---|---|
| resourceName | className |
| 'r1' | 'Painter' |
| 'r2' | 'Painting' |
| 'r3' | 'Painting' |
| 'r4' | 'Sculptor' |
| 'r5' | 'Sculpture' |

| property | | | | | |
|---|---|---|---|---|---|
| propertyName | domain | range | pre | post | depth |
| 'first' | 'Artist' | 'Literal' | 2 | 1 | 1 |
| 'last' | 'Painter' | 'Literal' | 3 | 2 | 1 |
| 'creates' | 'Artist' | 'Artifact' | 4 | 5 | 1 |
| 'sculpts' | 'Sculptor' | 'Sculpture' | 5 | 3 | 2 |
| 'paints' | 'Painter' | 'Painting' | 6 | 4 | 2 |
| 'title' | 'Artifact' | 'Literal' | 7 | 6 | 1 |

INFORMATION SEARCH DEVICE, INFORMATION SEARCH METHOD, COMPUTER PROGRAM, AND DATA STRUCTURE

CROSS REFERENCE TO RELATED APPLICATIONS

This application is a National Stage of International Application No. PCT/JP2011/002641 filed May 12, 2011, claiming priority based on Japanese Patent Application No. 2010-111940 filed May 14, 2010, the contents of all of which are incorporated herein by reference in their entirety.

TECHNICAL FIELD

The present invention relates to a device configured to search for information, more specifically, relates to an information search device configured to search for a target node from graph structure information expressed by nodes and edges connecting the nodes, an information search system, an information search method, a computer program, and a data structure.

BACKGROUND ART

As an information search device configured to search for a target node from graph structure information expressed by a graph composed of nodes and edges, a device described in Patent Document 1 is known. Graph structure information is information expressing elements configuring intended information as nodes and expressing a relation between the nodes as an edge.

The information search device described in Patent Document 1 executes clustering of graph structure information into subgraphs, and generates a table in which each node is an index and a table in which each edge is an index, for each of the subgraphs. This information search device then searches for a subgraph coincident with a query graph based on these tables.

Further, as another information search device like this, a device described in Non-Patent Document 1 is also known.

The information search device described in Non-Patent Document 1 searches for graph structure information expressed in RDF (Resource Description Framework). This information search device is equipped with a relational database (hereinafter, a database will also be described as a DB) creating part 91, a relational DB 92 and a searching part 93 as shown in FIG. 22. The relational DB 92 stores a class table, a property table, a type table, a resource table, a path table and a triple table as conceptually shown in FIG. 23.

In RDF, information is expressed by a sentence (hereinafter, also referred to as a triple) composed of three elements: a subject, a predicate and an object. A subject represents a resource in an information model, a predicate represents the property of the resource, and an object represents a resource or a property value. Moreover, in a RDF graph visualizing RDF, a resource is expressed by a node, and a property is expressed by an edge (also referred to as an arc).

This information search device registers information into the relational DB 92 in the following manner.

At first, the relational DB creating part 91 generates a class table, a property table, a type table, a resource table and a triple table, respectively, based on a given RDF graph.

Next, the relational DB creating part 91 determines a resource to become a root, and generates connections (arc paths) of all properties from the determined root resource to the respective other resources.

Further, the relational DB creating part 91 provides each of the generated arc paths with path ID (pathID), and registers a path expression (pathexp) representing each of the arc paths and the path ID thereof into the path table. At this moment, a path expression representing an arc path is expressed as a column of property names.

With respect to the relational DB 92 generated in the abovementioned manner, the searching part 93 generates a SQL query and executes search.

In the case of searching for information specified by designation of only a path, the searching part 93 can execute efficient search by using the path table. For example, with respect to the example of the relational DB 92 shown in FIG. 23, in the case of "displaying all of the titles of paintings drawn by someone," the searching part 93 generates a SQL query designating only a path as shown below and executes search.

```
SELECT r.resourceName
FROM path AS p, resource AS r
WHERE p.pathID = r.pathID
AND p.pathexp = '#title<#paints'
```

Further, in the case of searching for information which is not specified by designation of only a path, the searching part 93 executes search by using the triple table. Information which is not specified by designation of only a path is a resource referred to with a property that is a resource having a specific value as a property value, a resource referred to with a certain property from a resource having a specific value as a property value, and the like. For example, with respect to the example of the relational DB 92 shown in FIG. 23, in the case of "displaying all of the titles of paintings drawn by Pablo Picasso," the searching part 93 generates a query as shown below and executes search.

```
SELECT t1.object
FROM triple AS t1, triple AS t2, triple AS t3, triple AS t4
WHERE t1.predicate = 'paints'
AND t1.subject = t2.subject
AND t2.predicate = 'first'
AND t2.object = 'Picasso'
AND t1.subject = t3.subject
AND t3.predicate = 'last'
AND t3.object = 'Pablo'
```

[Patent Document 1] Japanese Unexamined Patent Application Publication No. 2009-258749

[Non-Patent Document 1] Akiyoshi Matono et al., "A Path-based Relational RDF Database," ADC '05: Proceedings of the 16$^{th}$ Australasian database conference, pp 95-103 (2005)

In the technique described in Patent Document 1, however, because the total number of tuples in the table using edges as indexes increases as graph structure information gets complicated, there is a problem that a time for searching for a subgraph satisfying a query graph increases.

Further, the technique described in Non-Patent Document 1 has a problem that it takes time to search for information which is not specified by designation of only a path.

This is because many join operations are executed at the time of execution of a query that cannot use the path table.

Further, the technique described in Non-Patent Document 1 has a problem that, even in the case of search for information specified by designation of only a path, a searching time increases as an information model gets complicated.

This is because, as an information model gets complicated, the number of tuples in the path table increases. Therefore, in Non-Patent Document 1, even in the case of a query that can use the path table, the number of times of comparison of a path expression to become a search key increases in order of the number of paths, and a searching time largely increases.

SUMMARY

The present invention has been made for solving the aforementioned problems, and an object of the present invention is to provide an information search device that can search for a target node at high speeds even if graph structure information gets complicated.

An information search device of the present invention is an information search device configured to search for a target node satisfying a search condition from graph structure information including a plurality of nodes and edges connecting the nodes as elements. The information search device includes: a path field generating part configured to, with respect to each of the nodes included by the graph structure information, extract paths each of which is a column of the elements that can be tracked from the node as an origin and, for each of the nodes, generate a path field in which the extracted paths are connected; an index generating part configured to, with respect to each of the elements configuring the graph structure information, generate a posting list which is a list of information composed of a node having a path field including the element and location information representing a location in which the element appears in the path field, and generate an index repository in which the element and the posting list are associated with each other; a search path generating part configured to generate a search path representing the search condition in a form of a column of the elements; and a searching part configured to search for nodes each of which has a path field including the respective elements included in the search path from the index repository, and search for the target node by extracting a node having a path field satisfying a sequence of appearance of the elements in the search path from among the searched nodes based on the location information.

Further, a data structure of the present invention is a data structure configured to store graph structure information including a plurality of nodes and edges connecting the nodes as elements. In the data structure, each of the elements and a posting list are stored so as to be associated with each other. The posting list is generated for each of the elements and is a list of information composed of: a node having a path field including the element among path fields of the respective nodes expressed by connecting paths each of which is a column of the elements that can be tracked from each of the nodes as an origin; and location information representing a location in which the element appears in the path field.

Further, an information search system of the present invention is an information search system including: a graph structure information storage device configured to store graph structure information including a plurality of nodes and edges connecting the nodes as elements; a client device configured to request for search for a target node satisfying a search condition from the graph structure information; and an information search device configured to search for the target node from the graph structure information. The information search device includes: a path field generating part configured to, with respect to each of the nodes included by the graph structure information, extract paths each of which is a column of the elements that can be tracked from the node as an origin and, for each of the nodes, generate a path field in which the extracted paths are connected; an index generating part configured to, with respect to each of the elements configuring the graph structure information, generate a posting list which is a list of information composed of a node having a path field including the element and location information representing a location in which the element appears in the path field, and generate an index repository in which the element and the posting list are associated with each other; a search path generating part configured to generate a search path representing the search condition in a form of a column of the elements; and a searching part configured to search for nodes each of which has a path field including the respective elements included in the search path from the index repository, and search for the target node by extracting a node having a path field satisfying a sequence of appearance of the elements in the search path from among the searched nodes based on the location information.

Further, a computer program of the present invention is a computer program for controlling an operation of an information search device configured to search for a target node satisfying a search condition from graph structure information including a plurality of nodes and edges connecting the nodes as elements. The computer program includes instructions for causing a computer to execute: a path field generating process of, with respect to each of the nodes included by the graph structure information, extracting paths each of which is a column of the elements that can be tracked from the node as an origin and, for each of the nodes, generating a path field in which the extracted paths are connected; an index generating process of, with respect to each of the elements configuring the graph structure information, generating a posting list which is a list of information composed of a node having a path field including the element and location information representing a location in which the element appears in the path field, and generating an index repository in which the element and the posting list are associated with each other; a search path generating process of generating a search path representing the search condition in a form of a column of the elements; and a searching process of searching for nodes each of which has a path field including the respective elements included in the search path from the index repository, and searching for the target node by extracting a node having a path field satisfying a sequence of appearance of the elements in the search path from among the searched nodes based on the location information.

Further, an information search method of the present invention includes:

by a graph structure information storage device, storing graph structure information including a plurality of nodes and edges connecting the nodes as elements;

by an information search device: with respect to each of the nodes included by the graph structure information, extracting paths each of which is a column of the elements that can be tracked from the node as an origin; for each of the nodes, generating a path field in which the extracted paths are connected; with respect to each of the elements configuring the graph structure information, generating a posting list which is a list of information composed of a node having a path field including the element and location information representing a location in which the element appears in the path field; and storing the element and the posting list in an index repository so as to be associated with each other;

by a client device, requesting the information search device to search for a target node satisfying a search condition in the graph structure information; and by the information search device: generating a search path representing the search condition in a form of a column of the elements; searching for nodes each of which has a path field including the respective elements included in the search path from the index repository; and searching for the target node by extracting a node having a path field satisfying a sequence of appearance of the elements in the search path from among the searched nodes based on the location information.

According to the present invention, it is possible to provide an information search device capable of searching for a target node at high speeds even if graph structure information gets complicated.

BRIEF DESCRIPTION OF DRAWINGS

FIG. 9 is a view for explaining an example of data stored in a path index in the second exemplary embodiment of the present invention;

FIGS. 10A, 10B and 10C are views for explaining an example of data stored in a literal property index in the second exemplary embodiment of the present invention;

FIG. 11 is a view for explaining an example of data stored in a metadata index in the second exemplary embodiment of the present invention;

FIG. 18 is a view for explaining an example of a path field in the third exemplary embodiment of the present invention;

FIG. 22 is a function block diagram showing the configuration of an information search device of a related art; and FIG. 23 is a view showing an example of a relational DB generated by an information search device of a related art.

EXEMPLARY EMBODIMENTS

Below, exemplary embodiments of the present invention will be described with reference to the drawings.
(First Exemplary Embodiment)

Figure 1:
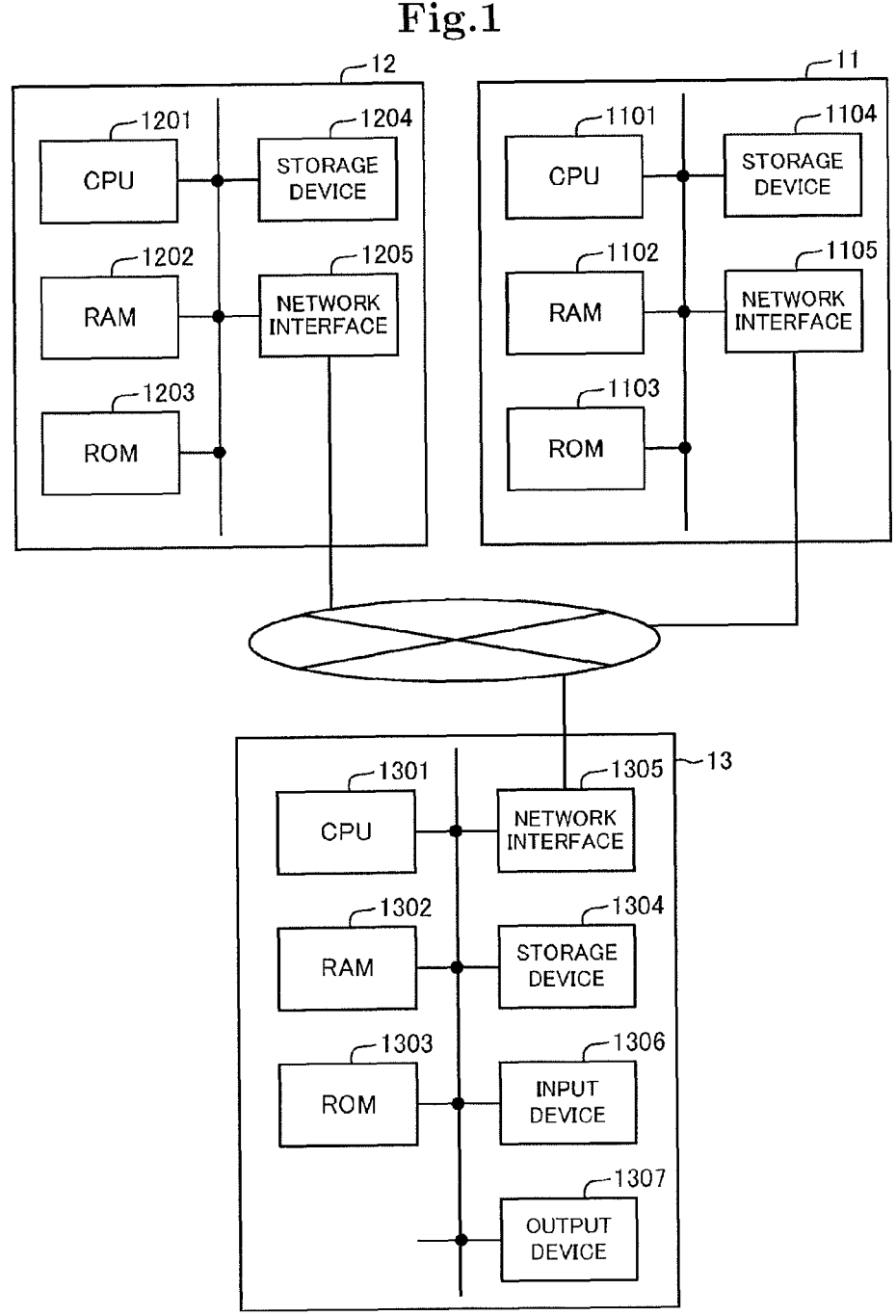
FIG. 1 is a hardware configuration diagram of an information search system as a first exemplary embodiment of the present invention.

The hardware configuration of an information search system 1 as a first exemplary embodiment of the present invention is shown in FIG. 1. In FIG. 1, the information search system 1 includes an information search device 11, a graph structure information storage device 12, and a client device 13. Moreover, the information search device 11, the graph structure information storage device 12 and the client device 13 are connected so as to be capable of communicating with each other.

The information search device 11 is configured by a versatile computer including at least a CPU (Central Processing Unit) 1101, a RAM (Random Access Memory) 1102, a ROM (Read Only Memory) 1103, a storage device 1104, and a network interface 1105.

Further, the graph structure information storage device 12 is configured by a versatile computer including at least a CPU 1201, a RAM 1202, a ROM 1203, a storage device 1204, and a network interface 1205.

Further, the client device 13 is configured by a versatile computer including at least a CPU 1301, a RAM 1302, a ROM 1303, a storage device 1304, a network interface 1305, an input device 1306, and an output device 1307.

Figure 2:
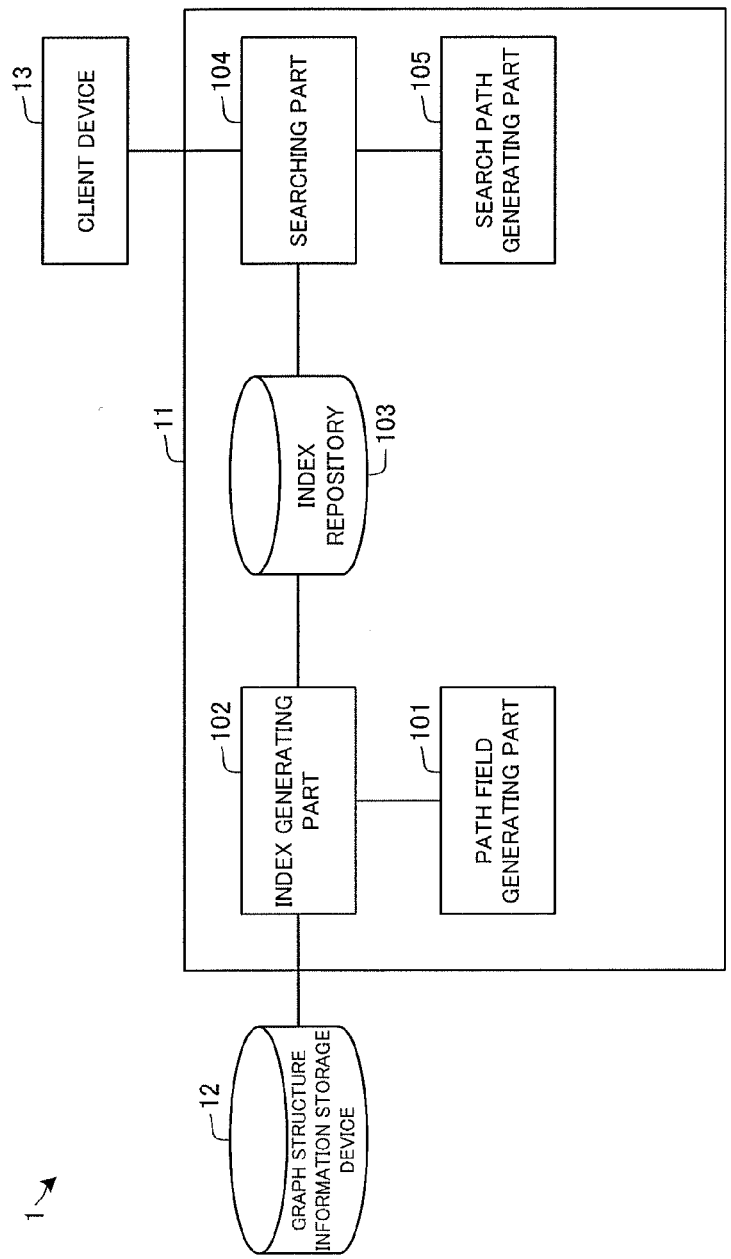
FIG. 2 is a function block diagram of the information search system as the first exemplary embodiment of the present invention.

Next, the function block configuration of the information search system 1 is shown in FIG. 2.

Figure 3:
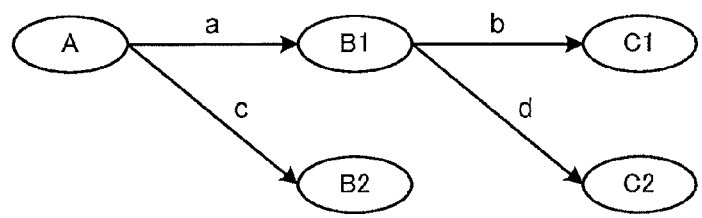
FIG. 3 is a conceptual view for explaining an example of graph structure information in the first exemplary embodiment of the present invention.

The graph structure information storage device 12 stores graph structure information including a plurality of nodes and edges connecting the nodes as elements, in the storage device 1204. An example of the graph structure information stored by the graph structure information storage device 12 is shown in FIG. 3. The graph structure information of FIG. 3 includes nodes A, B1, B2, C1 and C2 and edges a, b, c and d connecting the nodes as elements.

Further, the graph structure information storage device 12 provides graph structure information to the information search device 11 in response to a request from the information search device 11.

The client device 13 acquires information representing a request for search for a target node satisfying a search condition from among the graph structure information, via the input device 1306. The client device 13 then transmits the information representing the search request to the information search device 11. Moreover, the client device 13 outputs information that represents a search result acquired from the information search device 11, via the output device 1307.

The information search device 11 includes a path field generating part 101, an index generating part 102, an index repository 103, a searching part 104, and a search path generating part 105. The path field generating part 101, the index generating part 102, the searching part 104, and the search path generating part 105 are stored as a computer program in the storage device 1104, and realized by the CPU 1101 executing this by loading into the RAM 1102. Moreover, the index repository 103 is configured by the storage device 1104.

With respect to each of the nodes included in the graph structure information, the path field generating part 101 extracts one or more paths, which are columns of elements (i.e., columns of nodes and edges) that can be tracked from the node as the origin, from the graph structure information. The path field generating part 101 then generates a path field connecting the extracted one or more paths for each of the nodes.

The index generating part 102 generates the index repository 103 associating each of the elements (i.e., each of the nodes and each of the edges) configuring the graph structure information with a posting list. A posting list is a list that is generated for each of the elements and that is composed of a node having a path field including the element and information of a location that the element appears in the path field.

Location information included in the posting list may be a numerical value representing the order of a location that the element appears in the path field counted from the beginning, or may be other information allowing specification of a location that the element appears in the path field, for example.

The index repository 103 stores an element and a posting list of the element so as to be associated with each other as mentioned above.

The search path generating part 105 generates a search path representing a search condition in the form of a column of elements.

The searching part 104 searches for nodes having path fields including elements included in a search path, from the index repository 103. The searching part 104 then searches for a target node by extracting a node having a path field satisfying an appearance sequence of the elements in the search path from among the searched nodes, based on location information in a posting list.

An operation by the information search system 1 configured as described above will be explained.

Figure 4:
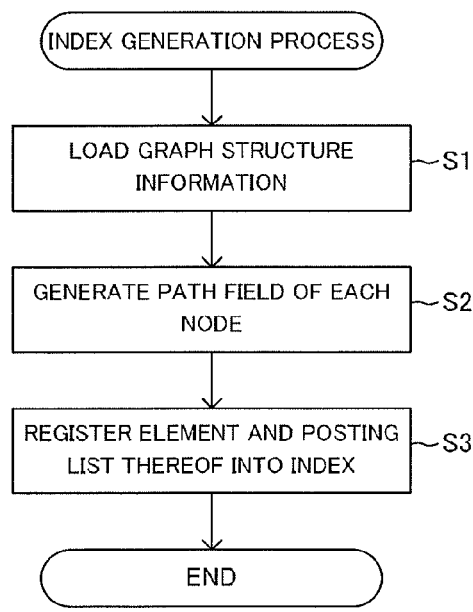
FIG. 4 is a flowchart for explaining an index generation operation by the information search system as the first exemplary embodiment of the present invention.

At first, a process of generating the index repository 103 by the information search device 11 will be described with reference to FIG. 4.

At first, the index generating part 102 loads graph structure information from the graph structure information storage device 12 (step S1).

Next, the path field generating part 101 generates a path field with respect to each node included in the loaded graph structure information (step S2).

For example, with respect to a node A in graph structure information shown in FIG. 3, the path field generating part 101 extracts three paths of a path [A][a][B1][b][C1], a path [A][a][B1][d][C2] and a path [A][c][B2], as columns of elements that can be tracked from the node A as the origin. The path field generating part 101 then connects these three paths to generate a path field [A][a][B1][b][C1][A][a][B1][d][C2][A][c][B2], as a path field of the node A. The path field generating part 101 also generates path fields with respect to the nodes B1, B2, C1 and C2.

Next, the index generating part 102 registers the respective elements configuring the graph structure information and posting lists of the respective elements so as to be associated with each other, into the index repository 103 (step S3).

For example, the index generating part 102 generates a posting list with respect to the element b configuring the graph structure information shown in FIG. 3. Expressing as X<i> that a certain element is included in a path field of a node X and appears $i^{th}$ from the beginning of the path field, the posting list of the element b is "A<4>,B1<2>."

The index generating part 102 then associates the element b with the posting list of the element b and registers into the index repository 103. Likewise, the index generating part 102 generates posting lists with respect to the other elements, and registers the generated posting lists into the index repository 103.

Thus, the information search device 11 ends the processes for generating the index repository 103.

Figure 5:
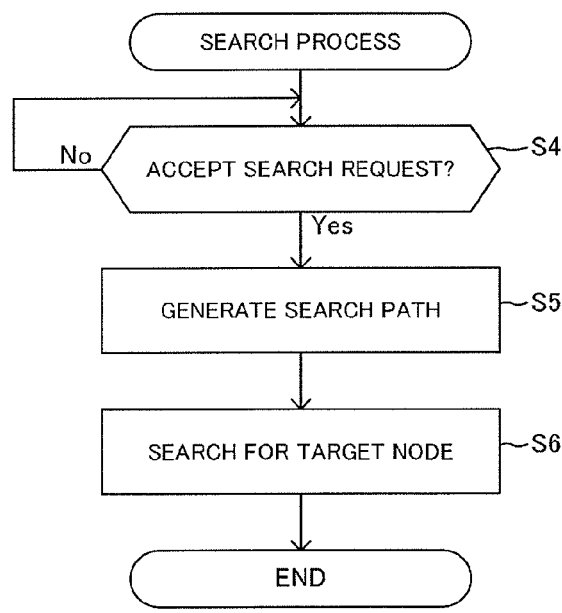
FIG. 5 is a flowchart for explaining a search operation by the information search system as the first exemplary embodiment of the present invention.

Next, an operation of searching for a target node by the information search system 1 will be described with reference to FIG. 5.

At first, the client device 13 requests the information search device 11 to search for a target node satisfying a search condition, and the information search device 11 accepts this ("Yes" at step S4).

For example, the client device 13 requests the information search device 11 to "search for a node having the node C1 at the end of the edge b" from the graph structure information shown in FIG. 3.

Next, the search path generating part 105 generates a search path representing the accepted search condition (step S5). For example, the search path generating part 105 generates a search path [x][b][C1] with respect to the example of the search condition described above. Here, [x] represents the target node.

Next, the searching part 104 searches for nodes having path fields including the respective elements included in the search path from the index repository 103 and extracts, as the target node, a node having a path field satisfying an appearance sequence of the elements included in the search path from among the searched nodes (step S6).

For example, the searching part 104 searches for the nodes A and B1 as nodes having path fields including the elements [b] and [C1] included in the search path. The searching part 104 then extracts the node B1 from among the searched nodes A and B1, as a node having a path field satisfying an appearance sequence that [b] appears second and [C1] appears third in the search path.

Thus, the description of the operation by the information search system 1 ends.

Next, an effect of the first exemplary embodiment of the present invention will be described.

The information search system as the first exemplary embodiment of the present invention can search for a target node at high speeds even if graph structure information gets complicated.

This is because graph structure information is stored by an index repository in which respective elements configuring the graph structure information are indexes and therefore it is possible to limit the number of tuples of an index repository to be searched to the order of the number of the elements configuring the graph structure information even if the graph structure information gets complicated. Therefore, it is possible to limit the number of times of comparison between an element as an index term of an index repository and an element included in a search path at the time of search for a target node to the order of the number of the elements configuring the graph structure information, and therefore, the abovementioned object is realized.

Further, the information search system as the first exemplary embodiment of the present invention can reduce the amount of consumption of resource of the storage device.

This is because the number of index terms as a factor determining the size of an index repository can be limited to the order of the number of elements configuring graph structure information.

Further, the data structure of the index repository in the first exemplary embodiment of the present invention is favorable as a data structure for storing graph structure information that is as a search object of an object node This is because the index repository stores the posting lists of the respective elements of the graph structure information so as to be associated with the respective elements and therefore it is possible to store the graph structure information while limiting the number of index terms. In this data structure, a node having a path field including terms included in a search path is searched for and filtered by using location information, and consequently, a target node can be searched at high speeds.

(Second Exemplary Embodiment)

Next, a second exemplary embodiment of the present invention will be described.

Figure 6:
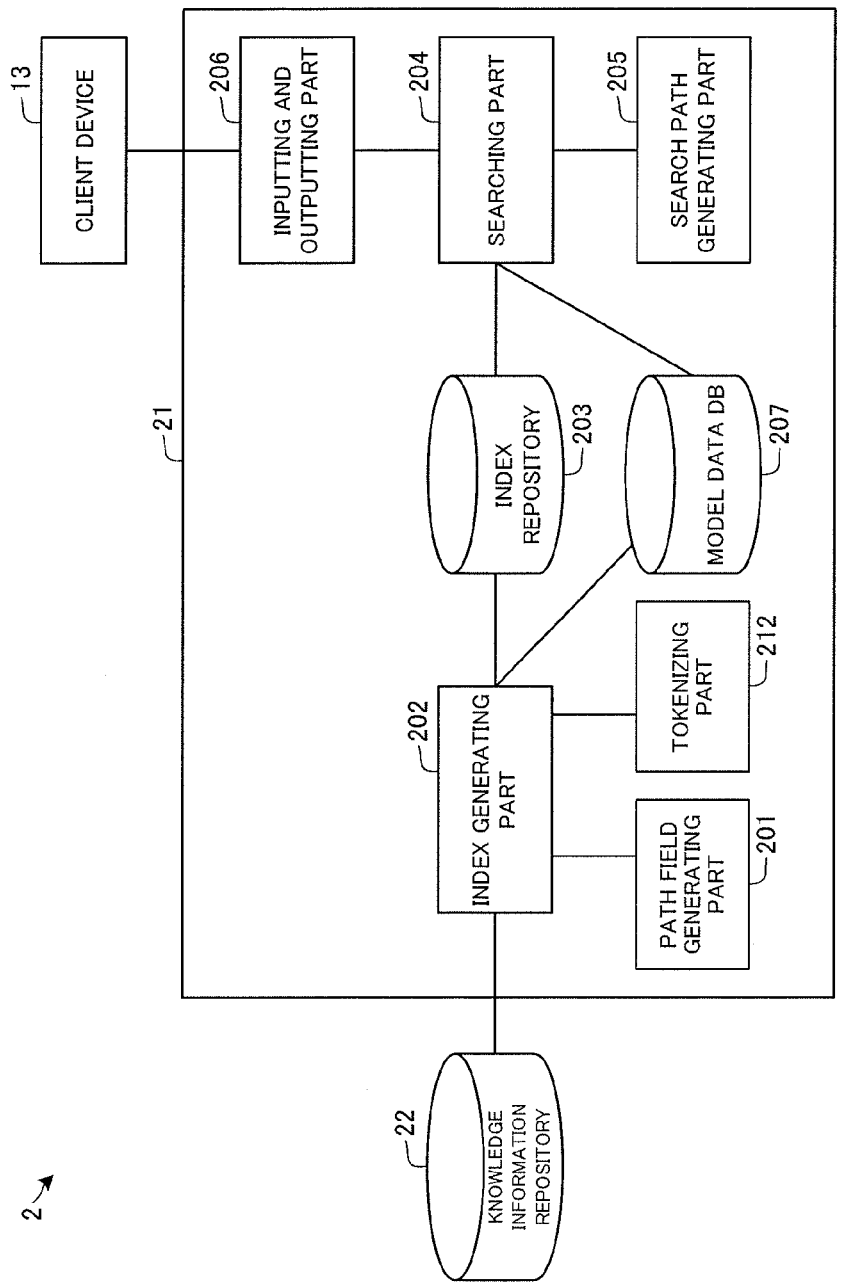
FIG. 6 is a function block diagram showing the configuration of an information search system as a second exemplary embodiment of the present invention.

At first, the configuration of an information search system 2 as a second exemplary embodiment of the present invention is shown in FIG. 6. In FIG. 6, the same components as in the first exemplary embodiment of the present invention are denoted by the same reference numerals, and a detailed description thereof in this exemplary embodiment will be omitted.

In FIG. 6, the information search system 2 includes an information search device 21, a knowledge information repository 22, and the client device 13. Moreover, the information search device 21, the knowledge information repository 22, and the client device 13 are connected so as to be capable of communicating with each other.

The information search device 21 and the knowledge information repository 22 are configured by versatile computers as the information search device 11 and the graph structure information storage device 12 in the first exemplary embodiment of the present invention are. The knowledge information repository 22 configures an exemplary embodiment of a graph structure information storage device in the present invention.

At first, the configuration of the knowledge information repository 22 will be described.

Figure 7:
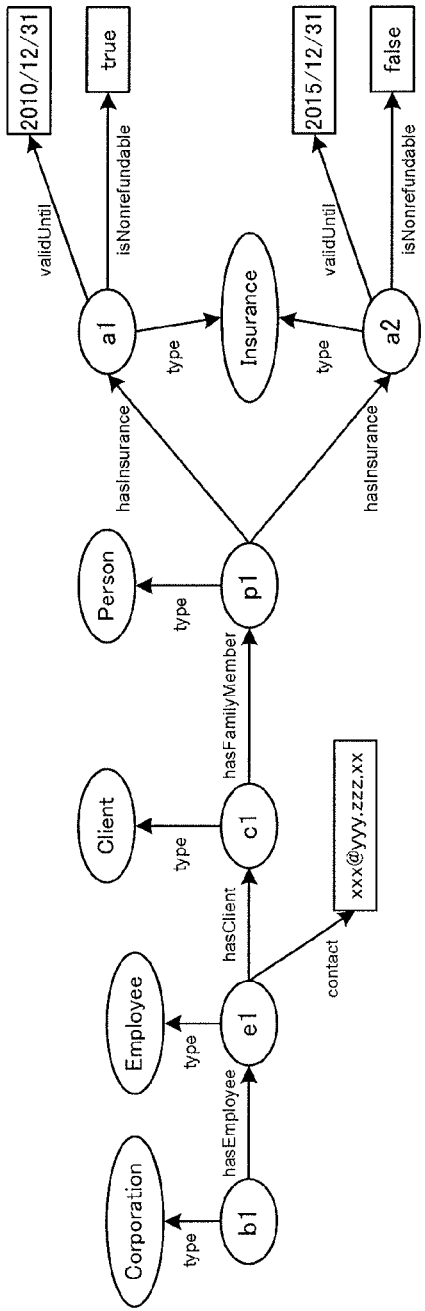
FIG. 7 is a conceptual view for explaining an example of a knowledge information model in the second exemplary embodiment of the present invention.

The knowledge information repository 22 stores a knowledge information model expressed by a RDF graph. The knowledge information model configures an exemplary embodiment of graph structure information in the present invention. An example of the knowledge information model stored in the knowledge information repository 22 is shown in FIG. 7. In the following description, a resource and a literal in RDF configure an exemplary embodiment of a node in the present invention, and a property in RDF configures an exemplary embodiment of an edge in the present invention.

In FIG. 7, an ellipse represents a resource, a rectangular represents a resource taking a concrete value (i.e., a literal), and an arrow represents a property as a relation between resources. A string in a resource represents resource ID for identifying the resource. A string on a property represents property ID for identifying the type of the property. A string in a literal represents a concrete value that the literal takes (i.e., a literal value). Here, resource ID and property ID may be URIs, numerical values, strings or the like, as far as they are information by which the types of the resource and the property can be uniquely identified. Resource ID, property ID and literal values are referred to as terms of a model (hereinafter, also referred to as terms).

FIG. 7 shows an example in which an employee and a client of the employee in an insurance company, the client's family, and information on insurance of the client's family are expressed by a RDF graph. A resource b1 denotes an entity of "Corporation" (a company) and has a resource e1 as "hasEmployee" (an employee). "To be an entity of "Corporation" (a company)" represents that "type" (the type) of the resource b1 is "Corporation." The resource e1 is an entity of "Employee" (an employee), has xxx@yyy.zzz.xx (an e-mail address) as "contact" (contact information), and has a resource c1 as "hasClient" (a client). The resource c1 is an entity of "Client" (a client), and has a resource p1 as "hasFamilyMember" (a family member). The resource p1 is an entity of "Person" (a person), and has a resource a1 and a resource a2 as "hasInsurance" (insurance policies). The resource a1 is an entity of "Insurance" (an insurance policy), has 2010/12/31 as "validUntil" (an expiry date), and has "true" (true) as "inNonrefundable" (a nonrefundable insurance policy or not). The resource a2 is an entity of "Insurance" (an insurance policy), has 2015/12/31 as "validUntil" (an expiry date), and has "false" (false) as "inNonrefundable" (a nonrefundable insurance policy or not).

With reference to FIG. 6 again, the configuration of the information search device 21 will be described.

The information search device 21 includes a path field generating part 201, an index generating part 202, a tokenizing part 212, an index repository 203, a searching part 204, a search path generating part 205, an inputting and outputting part 206, and a model data DB 207. The path field generating part 201, the index generating part 202, the tokenizing part 212, the searching part 204 and the search path generating part 205 are stored into the storage device of the computer as a computer program, and realized by the CPU executing this by loading into the RAM.

Further, the index repository 203 and the model data DB 207 are configured by the storage device of the computer. The model data DB 207 configures an exemplary embodiment of a subgraph storing part in the present invention.

Further, the inputting and outputting part 206 is stored as a computer program in the storage device of the computer, and configured by the CPU executing this by loading into the RAM and by the network interface.

The path field generating part 201 generates a path field for each resource configuring the knowledge information model as the path field generating part 101 does.

To be specific, the path field generating part 201 extracts one or more paths each representing a column of resources and properties that can be tracked from each resource as the origin. The path field generating part 201 then expresses each of the extracted paths as a postfix path in which the resource ID, the property ID and the literal value are connected with the origin resource in the beginning Further, the path field generating part 201 generates, for each resource, a path field in which postfix paths representing all paths that can be tracked from one resource are connected. Furthermore, the path field generating part 201 replaces the resource ID of the origin resource with a reservation term "THIS" in the generated path field.

Figure 8:
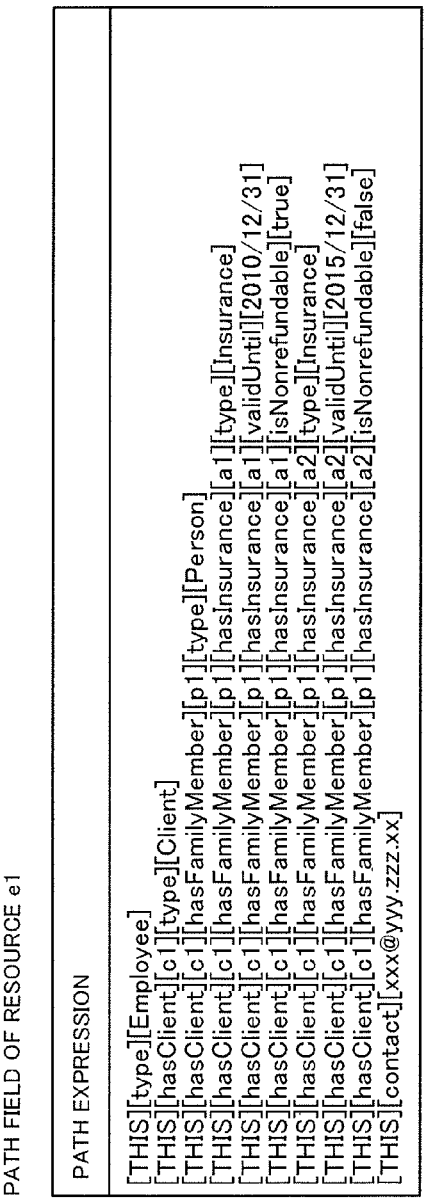
FIG. 8 is a view for explaining an example of a path field in the second exemplary embodiment of the present invention.

An example of a path field is shown in FIG. 8. FIG. 8 shows a path field generated for the resource e1 in the knowledge information model exemplified in FIG. 7. In FIG. 8, the path field of the resource e1 is generated by expressing ten paths that can be tracked from the origin resource e1 as postfix paths and connecting the postfix paths. Moreover, in the path field of the resource e1, resource ID e1 of the origin resource e1 is replaced with the reservation term "THIS."

The tokenizing part 212 divides the path field generated by the path field generating part 201 into terms of the knowledge information model. The tokenizing part 212 configures part of an exemplary embodiment of an index generating part in the present invention.

The index generating part 202 acquires the knowledge information model from the knowledge information repository 22. The index generating part 202 then causes the path field generating part 201 to generate a path field for each resource included in the knowledge information model.

Further, the index generating part 202 causes the tokenizing part 212 to divide the generated path field into terms, and registers into a path index, a literal property index group and a metadata index group of the index repository 203 described later.

The index repository 203 has a path index, a literal property index group, and a metadata index group.

The path index stores a term (resource ID, property ID, a literal value) configuring the knowledge information model and a posting list thereof in association with each other. A posting list is a list of information composed of resource ID of a resource having a path field including the term and location information that the term appears in the path field.

For example, an example of a path index corresponding to the knowledge information model shown in FIG. 7 is shown in FIG. 9. In FIG. 9, for example, the path index stores a term "type" and a posting list thereof in association with each other. The posting list of the term "type" is a list of information composed of resources b1, e1, c1, p1, a1 and a2 each having a path field including the term "type" and location information of the term "type" in the path field. FIG. 9 shows it in the form of e1<2,7 . . . > that the term "type" appears as the second term, the seventh term, and so on in the path field of the resource e1. Location information in a path field may be represented by a string, a numerical value, a symbol, a reference relation or the like other than the number of terms from the beginning in the path field, as far as it is information that allows specification of a location in which the term appears in the path field.

Further, as shown in FIG. 9, the path index also stores the reservation term "THIS" as an index term. A posting list associated with the reservation term "THIS" shows where each resource is located in the paths in the path field. A reservation term is not limited to "THIS" and may be information that does not overlap with the other terms.

The literal property index group includes indexes generated for each property ID of a property having a literal (i.e., a literal property) in the knowledge information model. Each literal property index stores a literal value and a resource having the property in association with each other.

For example, an example of the literal property index group corresponding to the knowledge information model shown in FIG. 7 is shown in FIG. 10. FIG. 10 shows a contact index (FIG. 10A), an isNonrefundable index (FIG. 10B) and a validUntil index (FIG. 10C) corresponding to property ID of the three literal properties "contact" "isNonrefundable" and "validUntil," respectively.

The number of literal property indexes included in the literal property index group is not limited to three, and depends on the number of types of literal properties included in a target knowledge information model.

Further, the index repository 203 does not need to separately store the literal property index group in different tables, and may store in the same table so as to be logically separated.

The metadata index group stores, with respect to a property having a special meaning in the knowledge information model, a resource and a property value in association with each other.

For example, an example of the metadata index for the knowledge information model shown in FIG. 7 is shown in FIG. 11. A "type" index shown in FIG. 11 is a metadata index prepared because "type" as a property is a special property representing the kind (also referred to as "class" or "type") of each resource. The "type" index stores a resource having the "type" property and a property value thereof so as to be associated with each other.

In this exemplary embodiment, an example of using the same string information as resource ID and property ID for identifying the kinds of resources and properties and as terms provided thereto. On the contrary, when different information is used therefor, the index repository 203 may have an ID index as a metadata index. In this case, the ID index stores resource ID and property ID so as to be associated with terms provided thereto.

Further, in the case of including a plurality of metadata indexes, the index repository 203 does not need to store separately in different tables, and may store in the same table so as to be logically distinguishable.

The index generating part 202 generates a posting list for each term representing each resource ID, each property ID and each literal value configuring the knowledge information model expressed in RDF. The index generating part 202 then registers each term and the posting list of each term into the index repository 203 so as to be associated with each other.

Figures 12, 13:
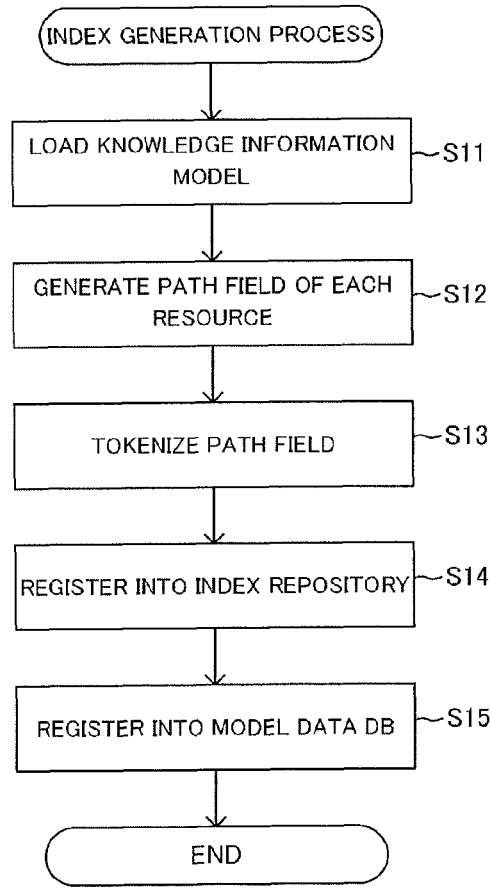
FIG. 12 is a view for explaining an example of data stored in a model data DB in the second exemplary embodiment of the present invention.
FIG. 13 is a flowchart for explaining an index generation operation of the information search system as the second exemplary embodiment of the present invention.

The model data DB 207 includes a subgraph table as shown in FIG. 12.

The subgraph table extracts, for each of the resources configuring the knowledge information model, a subgraph up to a predetermined depth from the resource and stores in association with resource ID.

In the example shown in FIG. 12, resource ID and a subgraph up to a resource or a literal value adjacent via one property to a resource having the resource ID are stored. An expression format of the subgraph stored in the subgraph table can be expression by a string such as N3 (Notation 3), binary data such as Java™ object, serialized data of binary data, a compression format of each of them, or the like. The expression format of the subgraph can be any format that can reproduce part of the original knowledge information model.

The inputting and outputting part 206 acquires a search condition from the client device 13 and informs the acquired search condition to the searching part 204. Moreover, the inputting and outputting part 206 outputs a search result informed by the searching part 204 to the client device 13.

The searching part 204 accepts the search condition from the inputting and outputting part 206, and causes the search path generating part 205 to generate a search path and a path query corresponding to the search path. The searching part 204 then searches the index repository 203 by using the generated path query.

Further, the searching part 204 acquires a subgraph of a resource of the search result from the model data DB 207, and outputs to the inputting and outputting part 206.

The search path generating part 205 generates a search path representing a search condition as a column of resources and properties.

For example, the search path generating part 205 extracts, as a restricted resource, a resource restricted so as to have a concrete literal value as a property in the search condition, and generates a column of resources and properties connecting a target resource and the restricted resource as a search path.

Depending on the content of the search condition, a search path can be a path that resources and properties are all specified from the beginning to the end, or can be a path in which part of resources or properties is specified and which includes an unspecified site.

Further, the search path generating part 205 generates a path query with respect to a path index, based on the appearance sequence of the resources and the properties in the generated search path. At this moment, in a case that the search path includes an unspecified site, the search path generating part 205 generates a path query in consideration of the number of elements that can be inserted into the unspecified site.

An operation by the information search system 2 configured as described above will be explained with reference to the drawings.

At first, a process of generating the index repository 203 by the information search device 21 will be explained with reference to FIG. 13.

At first, the index generating part 202 acquires a knowledge information model from the knowledge information repository 22 (step S11).

Next, the path field generating part 201 generates path fields connecting postfix paths with respect to the respective resources configuring the knowledge information model (step S212).

Next, the tokenizing part 212 tokenizes each of the generated path fields per term configuring the knowledge information model (step S13).

Next, the index generating part 202 generates a posting list for each term expressing each resource, each property and each literal configuring the knowledge information model. The index generating part 202 then registers each term and the posting list thereof in association with each other into a path index (step S14). In a case that the term is a literal property, the index generating part 202 registers into the literal property index. In a case that a term is a resource having a special property, the index generating part 202 registers into the metadata index.

Next, the index generating part 202 extracts a subgraph of each resource configuring the knowledge information model, and registers into the model data DB 207 (step S15).

Thus, the information search device 21 ends the index generating process.

There is no dependency relation of the order of execution between a series of processes at steps S12 to S14 and a process at step S15, and the information search device 21 may execute either first. Moreover, in a case that the information search device 21 is capable of executing two processes in parallel, the information search device 21 may execute the series of processes at steps S12 to S14 and the process at step S15 in parallel.

Figure 14:
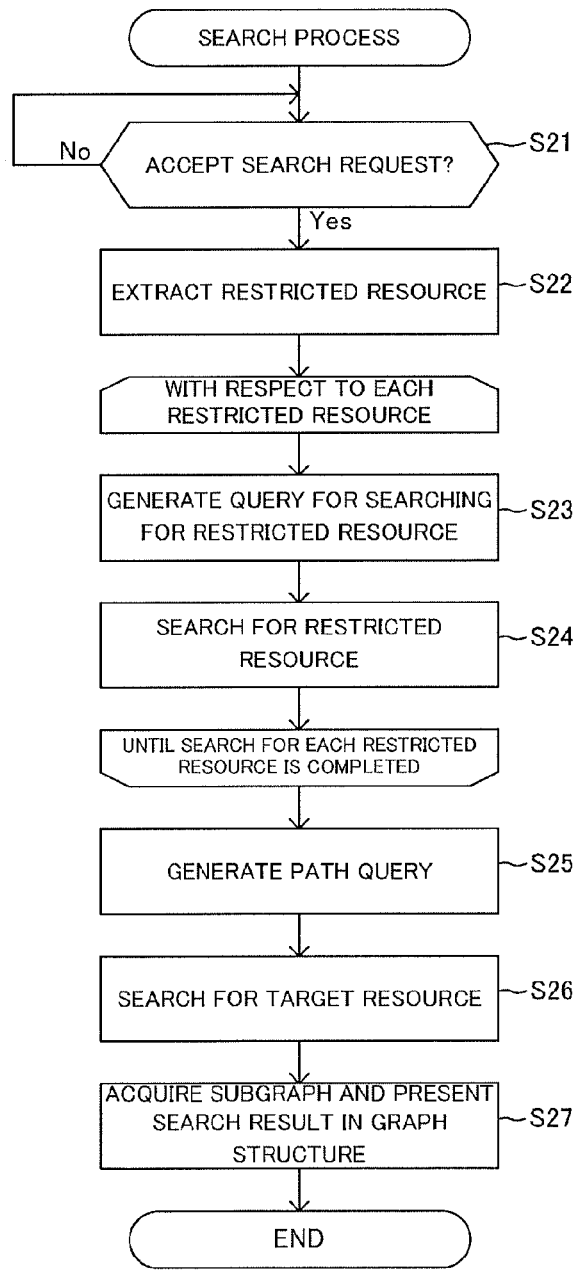
FIG. 14 is a flowchart for explaining a search operation of the information search system as the second exemplary embodiment of the present invention.

Next, a search process by the information search device 21 will be described with reference to FIG. 14.

At first, the inputting and outputting part 206 acquires a search condition of a target resource from the client device 13 ("Yes" at step S21).

Next, the searching part 204 extracts a group of restricted resources restricted so as to have concrete literal values as properties and the contents of restriction thereof, based on the search condition acquired by the inputting and outputting part 206 (step S22).

Next, the searching part 204 causes the search path generating part 205 to generate, with respect to each of the restricted resources having been extracted, a query for searching for the entity of the restricted resource based on the content of restriction thereof (step S23).

Next, the searching part 204 searches the index repository 203 by using the generated query and thereby obtains the entity set of the restricted resource (step S24).

The searching part 204 repeatedly executes generation of the query (step S23) and search (step S24) on all of the restricted resources extracted at step S22 and thereby acquires the entity sets of the group of restricted resources.

Next, the searching part 204 causes the search path generating part 205 to generate a search path, based on the search condition acquired at step S21 and the entity sets of the group of restricted resources searched for at step S24. The searching part 204 then causes the search path generating part 205 to generate a path query for searching for a path index based on the generated search path (step S25).

Next, the searching part 204 searches the index repository 203 by using the path query and acquires a resource ID group representing the result of the search (step S26).

Next, the searching part 204 acquires a subgraph group of the resource ID group representing the search result from the model data DB 207. The searching part 204 then forms the subgraph group and generates graph data representing the search result, and outputs the generated graph data to the inputting and outputting part 206. The inputting and outputting part 206 then outputs the graph data representing the search result to the client device 13 (step S27).

Thus, the information search device 21 ends the search process.

Figure 15:
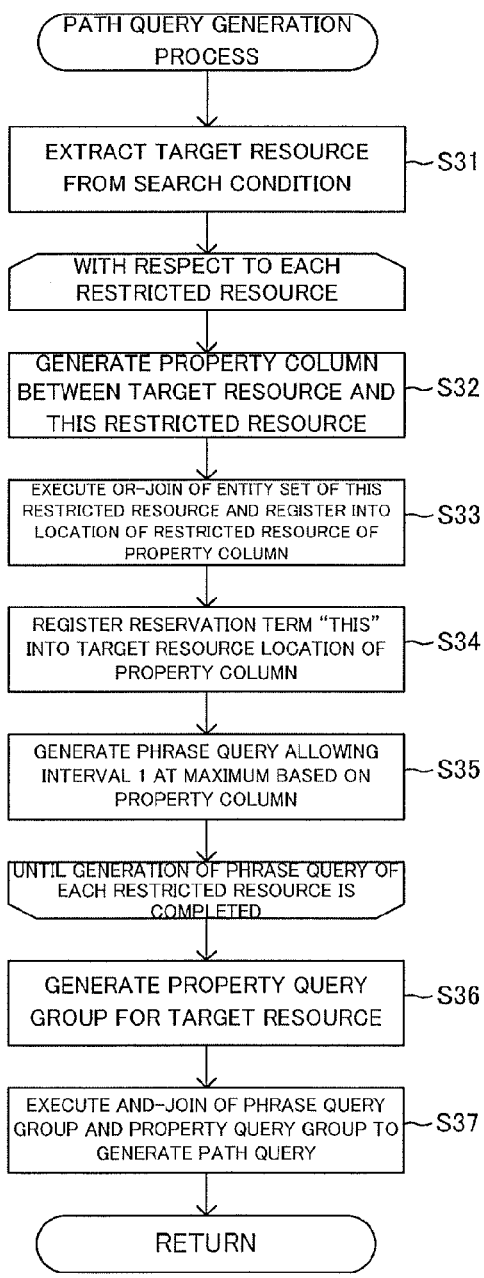
FIG. 15 is a flowchart for explaining a path query generation operation by the information search system as the second exemplary embodiment of the present invention.

The path query generation process at step S25 will be described in detail by using FIG. 15.

At first, the search path generating part 205 receives the search condition, the group of restricted resources, and the entity set group of the restricted resources from the searching part 204.

Next, the search path generating part 205 extracts a target resource desired to be obtained as the search result, based on the search condition (step S31).

Next, the search path generating part 205 executes the following process on each of the restricted resources.

At first, the search path generating part 205 specifies a range of properties on the knowledge information model between the target resource and the restricted resource, and generates a column of the properties as a search path (step S32).

Next, the search path generating part 205 executes an OR-join of the entity set of the restricted resource, and registers to the location of the restricted resource of the search path (step S33).

Next, the search path generating part 205 registers a reservation term "THIS" representing the target resource to the location of the target resource of the search path (step S34).

Next, the search path generating part 205 generates a phrase query allowing a distance 1 at the maximum between terms in consideration of an unspecified site (step S35). There is a case that the search path generated at steps S32 to S34 includes an unspecified site in which a resource has not been specified between the properties. Therefore, the search path generating part 205 generates a phrase query that it is possible to insert one resource at the maximum into the unspecified site between the properties. The number of elements that can be inserted between the properties is not limited to one, and is set in accordance with the content of the search condition as necessary.

The search path generating part 205 executes the processes of steps S32 to S35 on each of the restricted resources.

Next, in a case that the search condition includes a restriction on the property of the target resource, the search path generating part 205 generates a property query group (step S36).

Next, the search path generating part 205 executes an AND-join of a phrase query group with respect to all of the restricted resources and a property query group of the target resource, and returns as a path query to the searching part 204 (step S37).

Thus, a description of the path query generation process ends.

Next, an example of the search process by the information search device 21 will be described.

Here, a case in which the client device 13 requests the information search device 21 to search for "a salesperson assigned to a person having a family member having a non-refundable insurance policy expiring within 2010" from the knowledge information model shown in FIG. 7 will be described by using FIGS. 14 and 15 again.

At first, the inputting and outputting part 206 acquires a pseudo SQL statement (an expression 1) representing the abovementioned search condition from the client device 13 (step S21).

[Expression 1]
Select x; Where x type Employee, x
hasClient y, y hasFamilyMember z, z
hasInsurance i, i validUntil < 20110101, i
isNonrefundable true, i type Insurance;

Next, the searching part 204 extracts a variable i as a restricted resource from the expression 1 (step S22).

Next, the searching part 204 causes the search path generating part 205 to generate a query of an expression 2 by using a condition restricting the variable i, as a query for searching for the restricted resource (step S23).

[Expression 2]
Select i; Where i validUntil < 20110101, i
isNonrefundable true, i type Insurance;

Next, the searching part 204 searches the literal property index group and the metadata index group by using the expression 2, and obtains resource ID a1 as the entity of the restricted resource (step S24).

Next, the search path generating part 205 extracts x as the target resource from the expression 1 (step S31).

Next, the search path generating part 205 generates:
[hasClient][hasFamilyMember][hasInsurance]
as a search path between the target resource x and the restricted resource i (step S32).

Next, the search path generating part 205 adds the entity a1 of the restricted resource to the end, which is the location of the restricted resource, in the search path, and the search path becomes:
[hasClient][hasFamilyMember][hasInsurance][a1]
(Step S33).

Furthermore, the search path generating part 205 adds the reservation term "THIS" to the beginning, which is the location of the target resource, in the generated search path, and the search path becomes:
[THIS][hasClient][hasFamilyMember][hasInsurance][a1]
(step S34).

Next, the search path generating part 205 generates a phrase query allowing a distance 1 between terms in consideration of an unspecified site based on the generated search path (step S35). For example, this phrase query is expressed as follows:
THIS.{0,1}hasClient.{0,1}hasFamilyMember.{0,1}hasInsurance.{0,1}a1

Figure 16:
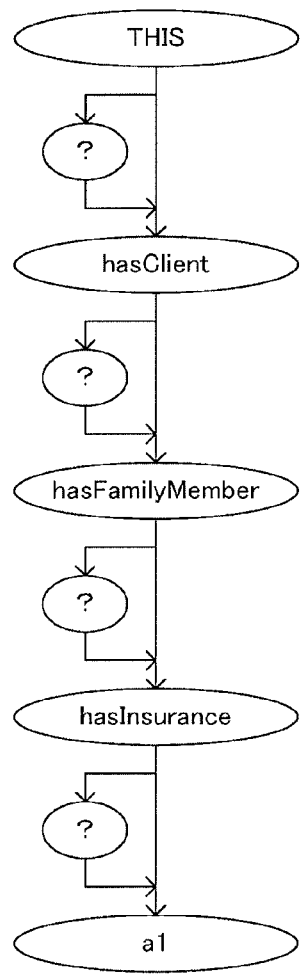
FIG. 16 is a conceptual view for explaining an example of a phrase query in the second exemplary embodiment of the present invention.

Here, ".{0,1}" represents that it is possible to insert one other term into the location. Moreover, this phrase query is conceptually shown in FIG. 16. Thus, the search path generating part 205 generates a phrase query in consideration of the appearance sequence of terms in the search path and the number of elements that can be inserted into an unspecified site.

Next, the search path generating part 205 generates a property query corresponding to "x type Employee" as a property restriction on the target resource x (step S36).

Next, the search path generating part 205 executes an AND join of the phrase query generated at step S35 and the property query generated at step S36, and returns as a path query (step S37).

The searching part 204 searches the path index, the literal property index group and the metadata index by using the path query, and obtains e1 as the target resource (step S26).

Here, an example of the operation of searching for the target resource by the searching part 204 at step S26 will be described in more detail.

(step S26-1): The searching part 204 searches for a resource including the term "THIS" located at the beginning of the phrase query from the path index (b1, e1, c1, p1, a1, a2 are searched for).

(step S26-2): The searching part 204 searches for the next term "hasClient" from the path index (b1, e1 are searched for).

(step S26-3): The searching part 204 merges the results of step S26-1 and S26-2 on a resource basis (b1, e1 are left).

(step S26-4): The searching part 204 searches for the next term "hasFamilyMember" from the path index (b1, e1, c1 are searched for).

(step S26-5): The searching part 204 merges the results of step S26-3 and S26-4 on a resource basis (b1, e1 are left).

(step S26-6): The searching part 204 searches for the next term "hasInsurance" from the path index (b1, e1, c1, p1 are searched for).

(step S26-7): The searching part 204 merges the results of step S26-5 and S26-6 on a resource basis (b1, e1 are left).

(step S26-8): The searching part 204 searches for the next term a1 from the path index (b1, e1, c1, p1 are searched for).

(step S26-9): The searching part 204 merges the results of step S26-7 and S26-8 on a resource basis (b1, e1 are left).

(step S26-10): The searching part 204 executes filtering of the resources based on location information of the path fields of the resources b1, e1 left after merged (e1 is left as the final search result).

The searching part 204 may execute the filtering process of step S26-10 after each of steps S26-1 to S26-9. Moreover, the searching part 204 may judge whether to execute this filtering process after each of steps S26-1 to S26-9 based on the trend of increase of the number of resources after the search process or the merge process.

Thus, the searching part 204 having obtained the resource e1 as the search result acquires the subgraph of the resource e1 from the model data DB 207, and outputs to the inputting and outputting part 206 (step S27).

The expression form of the search condition requested by the client device 13 is not limited to the pseudo SQL statement as shown by the expression 1 and, for example, may be information representing a RDF graph or a RDF query language such as SPARQL Protocol and RDF Query Language (SPARQL).

Next, an effect of the second exemplary embodiment of the present invention will be described.

The information search system as the second exemplary embodiment of the present invention can search for a target resource at high speeds even if a knowledge information model gets complicated.

This is because a path index uses terms configuring a knowledge information model as index terms and therefore, even if the knowledge information model gets complicated, it is possible to limit the number of index terms affecting the search speed to the order of the number of terms of the knowledge information model.

Further, this is because, at the time of search for a target resource, resources having path fields including the respective terms configuring a path query are searched for from a path index and merged to narrow down the resources and therefore it is possible to reduce the computational effort in the merge process. On the contrary, in Non-Patent Document 1, at the time of search for a target resource, resources that respectively satisfy conditions "x hasClient y" and "y hasFamilyMember z" are searched for and joined. Therefore, as a knowledge information model gets complicated, the number of tuples left after joined increases, and it takes time to execute a join operation.

Accordingly, the information search system as the second exemplary embodiment of the present invention can search at a substantially constant search speed with little influence even when a range of resources included in a search request gets long.

Further, the data structure of the path index in the second exemplary embodiment of the present invention is favorable as a data structure for storing a knowledge information model in which a target resource is searched for.

This is because the path index stores a term configuring the knowledge information model in association with a posting list thereof and therefore it is possible to store the knowledge information model while limiting the number of index terms. In this data structure, resources having path fields including the terms configuring the path query are searched for from the path index and then filtered by using location information, with the result that a target resource can be searched for at high speeds.

Further, according to the information search system as the second exemplary embodiment of the present invention, it is possible to reduce the amount of consumption of the resource for storing a knowledge information model.

This is because a data structure necessary for storing a knowledge information model can be only the model data DB and the index repository. Moreover, a subgraph in the model data DB is not used at the time of search and is used for presenting a search result, and therefore, can also be stored in compression format. Moreover, in the index repository, the path index can limit the number of index terms, which is a factor of determining the index size, to the order of not the number of paths but the number of terms. Furthermore, because the literal property index group and the metadata index group are sufficiently smaller than the path index and information stored therein is only terms and resource ID, the amount of consumption of the resource is small. Accordingly, both the model data DB and the index repository can be small in size, and it is possible to reduce the amount of consumption of the resource such as a storage device.

(Third Exemplary Embodiment)

Next, a third exemplary embodiment of the present invention will be described with reference to the drawings.

Figure 17:
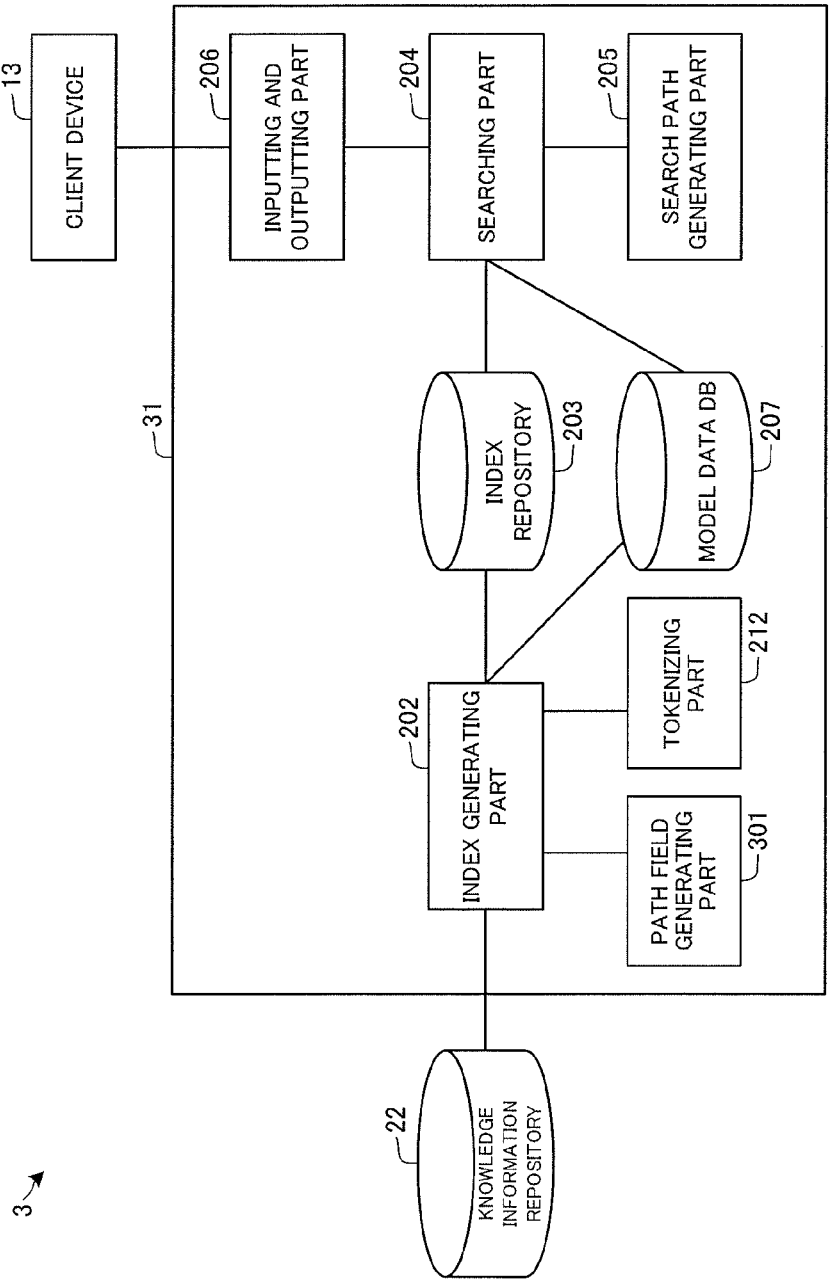
FIG. 17 is a function block diagram showing the configuration of an information search system as a third exemplary embodiment of the present invention.

At first, a function block configuration of an information search system 3 as the third exemplary embodiment of the present invention is shown in FIG. 17. In FIG. 17, the same components as in the second exemplary embodiment of the present invention will be denoted by the same reference numerals, and a detailed description thereof in this exemplary embodiment will be omitted.

The information search system 3 is different from the information search system 2 of the second exemplary embodiment of the present invention in including an information search device 31 having a path field generating part 301 in place of the path field generating part 201.

The path field generating part 301 is different from the path field generating part 201 in using, instead of a postfix path, a full path as a path that can be tracked from each resource as the origin. A fill path is a path that a path from a root resource to an origin resource is connected to a postfix path from the origin resource.

For example, an example of a path field generated by the path field generating path 301 is shown in FIG. 18. FIG. 18 shows a path field of a resource e1. The path field of the resource e1 is a path field that ten paths each having e1 as the origin are expressed by full paths and connected.

An operation in the third exemplary embodiment of the present invention configured as described above will be explained with reference to the drawings.

The information search system 3 as the third exemplary embodiment of the present invention executes the index generation process, the search process and the path query generation process as in the second exemplary embodiment of the present invention, but the index generation process is different from that of the second exemplary embodiment.

Figure 19:
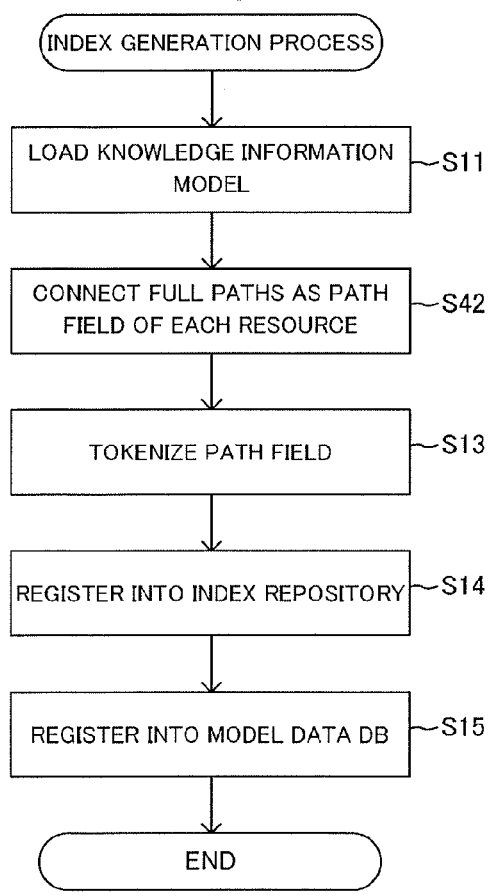
FIG. 19 is a flowchart for explaining an index generation operation by the information search system as the third exemplary embodiment of the present invention.

The index generation process by the information search system 3 will be described by using FIG. 19. The information search system 3 is different from the information search system 2 of the second exemplary embodiment of the present invention shown in FIG. 13 in executing, instead of step S12, step S42 of generating a path field by using full paths in the index generation process.

As an example of step S42, generation of a path field for the resource e1 of the knowledge information model shown in FIG. 7 will be described. The path field generating part 301 extracts ten paths each having the resource e1 as the origin. The path field generating part 301 then expresses each of the paths as a full path that a path from a root resource [b1] [hasEmployee] to the resource e1 and a postfix path from the resource e1 are connected, and connects the full paths as a path field of the resource e1.

The information search device 31 executes step S11 and steps S13 to S15 as in the index generation process in the second exemplary embodiment of the present invention, and then ends the index generation process.

Next, an effect of the third exemplary embodiment of the present invention will be described.

The information search system as the third exemplary embodiment of the present invention can increase a function of searching a knowledge information model.

This is because, by using a path field that full paths are connected, it is possible to respond to a search request for searching for a path from a restricted resource to a target resource, for example, "an employee working in a company with sales of 500 million yen or more."

(Fourth Exemplary Embodiment)

Next, a fourth exemplary embodiment of the present invention will be described in detail with reference to the drawings.

Figure 20:
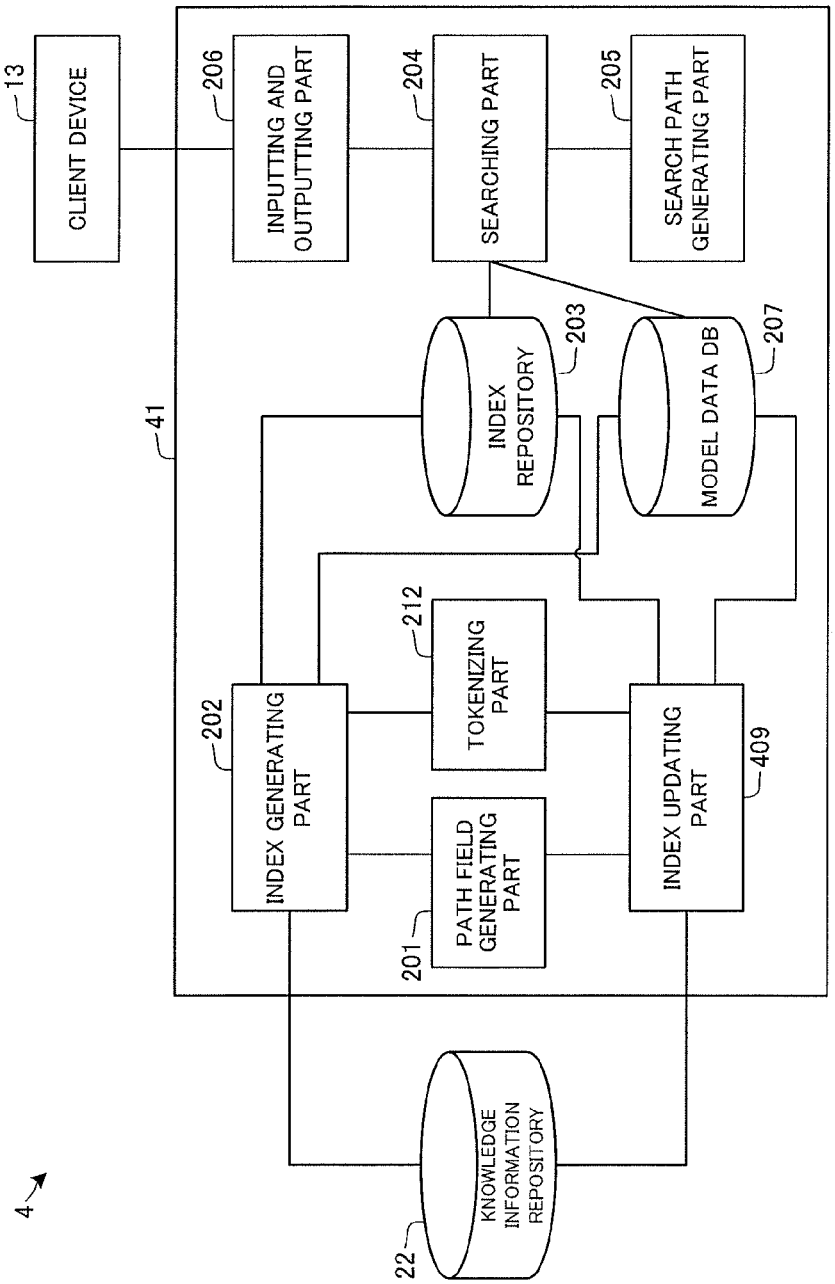
FIG. 20 is a function block diagram showing the configuration of an information search system as a fourth exemplary embodiment of the present invention.

At first, a function block configuration of an information search system 4 as the fourth exemplary embodiment of the present invention will be described with reference to FIG. 20. In FIG. 20, the same components as in the second exemplary embodiment of the present invention will be denoted by the same reference numerals, and a detailed description thereof in this exemplary embodiment will be omitted.

The information search system 4 is different the information search system 2 of the second exemplary embodiment of the present invention in including an information search device 41 further having an index updating part 409.

The index updating part 409 acquires a resource, a property relating to the resource, and a resource or a literal that is an object of the property from the knowledge information repository 22. The index updating part 409 then executes comparison with the subgraph registered in the model data DB 207, and specifies a resource having been changed, added or deleted as a difference resource. The index updating part 409 then executes update of information relating to the difference resource among the information stored in the index repository 203 and the model data DB 207.

An operation by the information search system 4 configured as described above will be explained with reference to the drawings.

Because the index generation process, the search process and the path query generation process executed by the information search system 4 are similar to those executed by the information search system 2 of the second exemplary embodiment of the present invention, a detailed explanation of these operations will be omitted.

Figure 21:
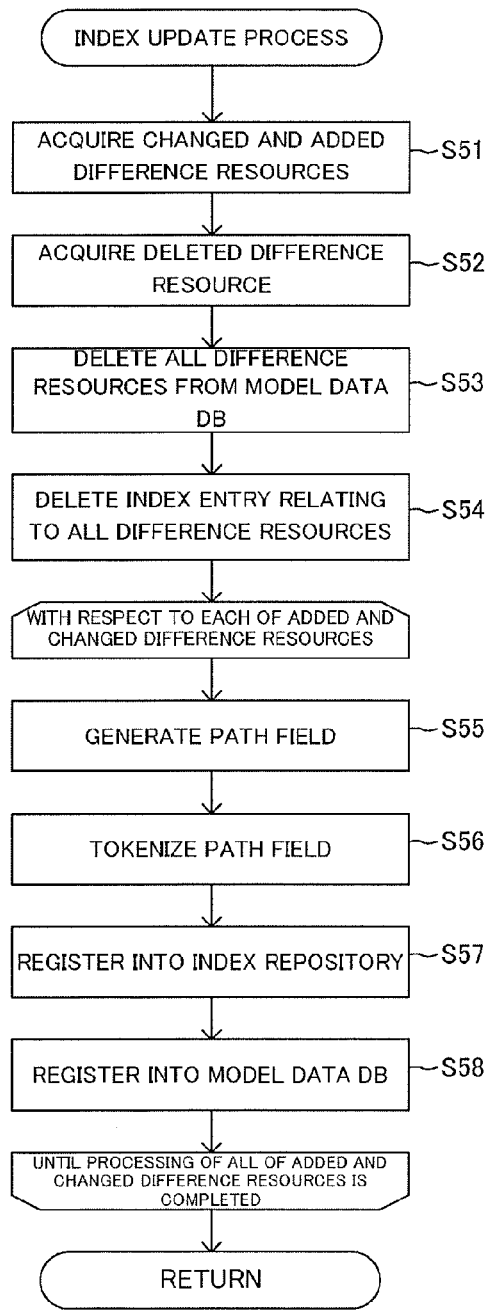
FIG. 21 is a flowchart for explaining an index update operation by the information search system as the fourth exemplary embodiment of the present invention.

Further, the information search system 4 executes an index updating process. The index updating process executed by the information search system 4 will be described by using FIG. 21.

At first, the index updating part 409 acquires a resource, a property relating to the resource, and a resource or a literal of an object of the property from the knowledge information repository 22. The index updating part 409 then compares the acquired information with a subgraph already registered in the model data DB 207, and temporarily stores a difference resource having been changed or updated (step S51).

Next, the index updating part 409 specifies a resource that is registered in the model data DB 207 but is not in the knowledge information repository 22, and temporarily stores as a difference resource having been deleted (step S52)

Next, the index updating part 409 deletes all of the difference resources and the subgraphs thereof from the model data DB 207 (step S53).

Next, the index updating part 409 deletes information relating to all of the difference resources from the index repository 203 (step S54). To be specific, the index updating part 409 deletes a tuple corresponding to the difference resource from a path index. Moreover, from a posting list including the information relating to the differential resource, the index updating part 409 deletes the information. Moreover, the index updating part 409 also deletes a tuple relating to the difference resource from the literal property index group and the metadata index group.

Next, the index updating part 409 executes the following process on each of the difference resources having been changed or added.

At first, the index updating part 409 causes the path field generating part 201 to generate a path field of this difference resource (step S55).

Next, the index updating part 409 causes the tokenizing part 212 to tokenize the path field generated at step S55 in a unit of a term based on terms in a model obtained from the knowledge information repository 22 (step S56).

Next, the index updating part 409 registers information relating to this difference resource into the index repository 203 (step S57). To be specific, based on the tokenized path field, the index updating part 409 generates a posting list of this difference resource and registers into the path index. Moreover, to a posting list of each term included in the path field of this difference resource, the index updating part 409 adds information composed of this difference resource and location information of the term in this path field. Moreover, in a case that this difference resource is a resource having a literal property or a special property, the index updating part 409 also registers into the literal property index group or the metadata index group.

Next, the index updating part 409 registers this difference resource and a subgraph of a predetermined depth from this resource into the model data DB 207 (step S58).

After executing the processes of steps S55 to S58 on all of the difference resources having been changed or added, the information search system 4 ends the index update process.

Next, an effect of the fourth exemplary embodiment of the present invention will be described.

An information search system as the fourth exemplary embodiment of the present invention can more efficiently execute a process of updating an index repository for allowing search for a target resource from knowledge information at higher speeds.

This is because, by comparing a knowledge information repository and a model data DB, it is possible to specify a change site of a knowledge information model, and only the specified change site is updated in the index repository and the model data DB. At this moment, because the number of index terms of the index repository and the model data DB is limited to the order of the number of terms of the model, it is possible to shorten an update time for reflecting the changed site to the index repository and the model data DB.

In the description of the information search systems as the second to fourth exemplary embodiments, each of the information search systems searches for a target resource from the knowledge information model expressed in a RDF model as graph information. However, each of the information search systems can also be applied in the case of searching for a target node from other graph structure information represented by a plurality of nodes and an edge connecting the nodes.

Further, in each of the exemplary embodiments of the present invention described above, the operation of the information search device described with reference to each of the flowcharts may be stored in a storage device (a storage medium) of the information search device as a computer program of the present invention so that the CPU retrieves and executes the computer program. In such a case, the present invention is configured by a code of the computer program or a storage medium. Moreover, by execution of the computer program by the CPU, the respective processes by the path field generating part, the index generating part, the index updating part, the tokenizing part, the searching part and the search path generating part shown in the function block diagram in each of the aforementioned exemplary embodiments are realized.

Further, in each of the exemplary embodiments of the present invention described above, the graph structure storage device and the knowledge information repository may be configured as a local file system by the storage device of the computer configuring the information search device.

Further, in each of the exemplary embodiments of the present invention described above, the client device may be realized on the same computer by application stored in the storage device of a computer configuring the information search device.

Further, in each of the exemplary embodiments of the present invention described above, the information search device may acquire a search request from a user via the input and output device, instead of acquiring a search request from the client device. In this case, the information search device may also present the search result to the user via the input and output device.

Further, the respective exemplary embodiments described above can be properly combined and implemented.

Further, the present invention can be implemented in various modes without being limited to the respective exemplary embodiments described above.

Further, the whole or part of the exemplary embodiments disclosed above can be described as, but not limited to, the following supplementary notes.

(Supplementary Note 1)

An information search device configured to search for a target node satisfying a search condition from graph structure information including a plurality of nodes and edges connecting the nodes as elements, the information search device comprising:

a path field generating part configured to, with respect to each of the nodes included by the graph structure information, extract paths each of which is a column of the elements that can be tracked from the node as an origin and, for each of the nodes, generate a path field in which the extracted paths are connected;

an index generating part configured to, with respect to each of the elements configuring the graph structure information, generate a posting list which is a list of information composed of a node having a path field including the element and location information representing a location in which the element appears in the path field, and generate an index repository in which the element and the posting list are associated with each other;

a search path generating part configured to generate a search path representing the search condition in a form of a column of the elements; and a searching part configured to search for nodes each of which has a path field including the respective elements included in the search path from the index repository, and search for the target node by extracting a node having a path field satisfying a sequence of appearance of the elements in the search path from among the searched nodes based on the location information.

(Supplementary Note 2)

The information search device according to Supplementary Note 1, wherein the searching part is configured to, in a case that part of the search path has an unspecified site, search for the target node based on a sequence of appearance of elements in the search path and a number of elements that can be inserted into the unspecified site.

(Supplementary Note 3)

The information search device according to Supplementary Note 1 or 2, wherein the path field generating part is configured to generate the path field by expressing each of the paths that can be tracked from the node as the origin in a form of a column of the elements from a root node in the graph structure information.

(Supplementary Note 4)

The information search device according to any of Supplementary Notes 1 to 3, further comprising an index updating part configured to acquire difference information representing an element changed in the graph structure information, and update the index repository by controlling the path field generating part and the index generating part based on the difference information.

(Supplementary Note 5)

The information search device according to any of Supplementary Notes 1 to 4, further comprising:

a subgraph storing part configured to extract a predetermined-depth subgraph with each of the nodes as an origin from the graph structure information, and store the extracted subgraph; and a search result presenting part configured to present a subgraph with the target node searched by the searching part as an origin.

(Supplementary Note 6)

A data structure configured to store graph structure information including a plurality of nodes and edges connecting the nodes as elements, wherein each of the elements and a posting list are stored so as to be associated with each other, the posting list being generated for each of the elements and being a list of information composed of: a node having a path field including the element among path fields of the respective nodes expressed by connecting paths each of which is a column of the elements that can be tracked from each of the nodes as an origin; and location information representing a location in which the element appears in the path field.

(Supplementary Note 7)

The data structure according to Supplementary Note 6, wherein the location information included in the posting list represents a location in a path field in which paths that can be tracked from each of the nodes as the origin are expressed in a form of a column of the elements from a root node in the graph structure information and connected with each other.

(Supplementary Note 8)

An information search system comprising:

a graph structure information storage device configured to store graph structure information including a plurality of nodes and edges connecting the nodes as elements;

a client device configured to request for search for a target node satisfying a search condition from the graph structure information; and an information search device configured to search for the target node from the graph structure information, wherein the information search device comprises:

a path field generating part configured to, with respect to each of the nodes included by the graph structure information, extract paths each of which is a column of the elements that can be tracked from the node as an origin and, for each of the nodes, generate a path field in which the extracted paths are connected;

an index generating part configured to, with respect to each of the elements configuring the graph structure information, generate a posting list which is a list of information composed of a node having a path field including the element and location information representing a location in which the element appears in the path field, and generate an index repository in which the element and the posting list are associated with each other;

a search path generating part configured to generate a search path representing the search condition in a form of a column of the elements; and a searching part configured to search for nodes each of which has a path field including the respective elements included in the search path from the index repository, and search for the target node by extracting a node having a path field satisfying a sequence of appearance of the elements in the search path from among the searched nodes based on the location information.

(Supplementary Note 9)

A computer program for controlling an operation of an information search device configured to search for a target node satisfying a search condition from graph structure information including a plurality of nodes and edges connecting the nodes as elements, the computer program comprising instructions for causing a computer to execute:

a path field generating process of, with respect to each of the nodes included by the graph structure information, extracting paths each of which is a column of the elements that can be tracked from the node as an origin and, for each of the nodes, generating a path field in which the extracted paths are connected;

an index generating process of, with respect to each of the elements configuring the graph structure information, generating a posting list which is a list of information composed of a node having a path field including the element and location information representing a location in which the element appears in the path field, and generating an index repository in which the element and the posting list are associated with each other;

a search path generating process of generating a search path representing the search condition in a form of a column of the elements; and a searching process of searching for nodes each of which has a path field including the respective elements included in the search path from the index repository, and searching for the target node by extracting a node having a path field satisfying a sequence of appearance of the elements in the search path from among the searched nodes based on the location information.

(Supplementary Note 10)

An information search method, comprising:

by a graph structure information storage device, storing graph structure information including a plurality of nodes and edges connecting the nodes as elements;

by an information search device: with respect to each of the nodes included by the graph structure information, extracting paths each of which is a column of the elements that can be tracked from the node as an origin; for each of the nodes, generating a path field in which the extracted paths are connected; with respect to each of the elements configuring the graph structure information, generating a posting list which is a list of information composed of a node having a path field including the element and location information representing a location in which the element appears in the path field; and storing the element and the posting list in an index repository so as to be associated with each other;

by a client device, requesting the information search device to search for a target node satisfying a search condition in the graph structure information; and by the information search device: generating a search path representing the search condition in a form of a column of the elements; searching for nodes each of which has a path field including the respective elements included in the search path from the index repository; and searching for the target node by extracting a node having a path field satisfying a sequence of appearance of the elements in the search path from among the searched nodes based on the location information.

(Supplementary Note 11)

An information search method comprising, by an information search device configured to search for a target node satisfying a search condition from graph structure information including a plurality of nodes and edges connecting the nodes as elements:

with respect to each of the nodes included by the graph structure information, extracting paths each of which is a column of the elements that can be tracked from the node as an origin;

for each of the nodes, generating a path field in which the extracted paths are connected;

with respect to each of the elements configuring the graph structure information, generating a posting list which is a list of information composed of a node having a path field including the element and location information representing a location in which the element appears in the path field;

storing the element and the posting list in an index repository so as to be associated with each other;

generating a search path representing the search condition in a form of a column of the elements;

searching for nodes each of which has a path field including the respective elements included in the search path from the index repository; and searching for the target node by extracting a node having a path field satisfying a sequence of appearance of the elements in the search path from among the searched nodes based on the location information.

(Supplementary Note 12)

The information search system according to Supplementary Note 8, wherein the searching part of the information search device is configured to, in a case that part of the search path has an unspecified site, search for the target node based on a sequence of appearance of elements in the search path and a number of elements that can be inserted into the unspecified site.

(Supplementary Note 13)

The computer program according to Supplementary Note 9, comprising instructions for causing the computer to, in the search process, in a case that part of the search path has an unspecified site, search for the target node based on a sequence of appearance of elements in the search path and a number of elements that can be inserted into the unspecified site.

(Supplementary Note 14)

The information search method according to Supplementary Note 11, wherein when searching for the target node, in a case that part of the search path has an unspecified site, the information search device searches for the target node based on a sequence of appearance of elements in the search path and a number of elements that can be inserted into the unspecified site.

The present invention is based upon and claims the benefit of priority from Japanese patent application No. 2010-111940, filed on May 14, 2010, the disclosure of which is incorporated herein in its entirety by reference.

Industrial Applicability

The present invention can provide an information search device capable of searching for a target node at high speeds even if graph structure information gets complicated, and is favorable as a knowledge information search device configured to search for a target resource from a large-scale knowledge information model, for example.

DESCRIPTION OF REFERENCE NUMERALS 1, 2, 3, 4 information search system
11, 21, 31, 41 information search device 12 graph structure information storage device
13 client device
22 knowledge information repository
101, 201, 301 path field generating part
102, 202 index generating part
103, 203 index repository
104, 204 searching part
105, 205 search path generating part
206 inputting and outputting part
207 model data DB
212 tokenizing part
409 index updating part

The invention claimed is:

1. An information search device configured to search for a target node satisfying a search condition from graph structure information including a plurality of nodes and edges connecting the nodes as elements, the information search device comprising:
   a path field generating part configured to, with respect to each of the nodes included by the graph structure information, extract paths, each extracted path is a column of the elements that can be tracked from the node as an origin and, for each of the nodes, generate a path field in which the extracted paths are connected;
   an index generating part configured to, with respect to each of the elements configuring the graph structure information, generate a posting list which is a list of information composed of a node having a respective path field including the element and location information representing a location in which the element appears in the respective path field, and generate an index repository in which the element and the posting list are associated with each other;
   a search path generating part configured to generate a search path representing the search condition in a form of a column of the elements; and
   a searching part configured to search for nodes, each of the searched nodes has a respective path field including the respective elements included in the search path from the index repository, and search for the target node by extracting the node having the respective path field satisfying a sequence of appearance of the elements in the search path from among the searched nodes based on the location information.

2. The information search device according to claim 1, wherein the searching part is configured to, in a case that part of the search path has an unspecified site, search for the target node based on a sequence of appearance of elements in the search path and a number of elements that can be inserted into the unspecified site.

3. The information search device according to claim 1, wherein the path field generating part is configured to generate the respective path field by expressing each of the paths that can be tracked from the node as the origin in a form of a column of the elements from a root node in the graph structure information.

4. The information search device according to claim 1, further comprising an index updating part configured to acquire difference information representing an element changed in the graph structure information, and update the index repository by controlling the path field generating part and the index generating part based on the difference information.

5. The information search device according to claim 1, further comprising:
   a subgraph storing part configured to extract a predetermined-depth subgraph with each of the nodes as an origin from the graph structure information, and store the extracted subgraph; and
   a search result presenting part configured to present a subgraph with the target node searched by the searching part as an origin.

6. A non-transitory computer-readable medium storing a computer program for controlling an operation of an information search device configured to search for a target node satisfying a search condition from graph structure information including a plurality of nodes and edges connecting the nodes as elements, wherein the computer program comprises instructions for causing a computer to execute:
   a path field generating process of, with respect to each of the nodes included by the graph structure information, extracting paths, each extracted path is a column of the elements that can be tracked from the node as an origin and, for each of the nodes, generating a path field in which the extracted paths are connected;
   an index generating process of, with respect to each of the elements configuring the graph structure information, generating a posting list which is a list of information composed of a node having a respective path field including the element and location information representing a location in which the element appears in the respective path field, and generating an index repository in which the element and the posting list are associated with each other;
   a search path generating process of generating a search path representing the search condition in a form of a column of the elements; and
   a searching process of searching for nodes, each of the searched nodes has a respective path field including the respective elements included in the search path from the index repository, and searching for the target node by extracting the node having the respective path field satisfying a sequence of appearance of the elements in the search path from among the searched nodes based on the location information.

7. The non-transitory computer-readable medium according to claim 6, wherein the computer program comprises instructions for causing the computer to, in the search process, in a case that part of the search path has an unspecified site, search for the target node based on a sequence of appearance of elements in the search path and a number of elements that can be inserted into the unspecified site.

8. An information search method, comprising:
   by a graph structure information storage device, storing graph structure information including a plurality of nodes and edges connecting the nodes as elements;
   by an information search device: with respect to each of the nodes included by the graph structure information, extracting paths, each extracted path is a column of the elements that can be tracked from the node as an origin; for each of the nodes, generating a path field in which the extracted paths are connected; with respect to each of the elements configuring the graph structure information, generating a posting list which is a list of information composed of a node having a respective path field including the element and location information representing a location in which the element appears in the respective path field; and storing the element and the posting list in an index repository so as to be associated with each other;
   by a client device, requesting the information search device to search for a target node satisfying a search condition in the graph structure information; and by the information search device: generating a search path representing the search condition in a form of a column of the elements; searching for nodes, each of the searched nodes has a respective path field including the respective elements included in the search path from the index repository; and searching for the target node by extracting the node having the respective path field satisfying a sequence of appearance of the elements in the search path from among the searched nodes based on the location information.

9. The information search method according to claim 8, wherein when searching for the target node, in a case that part of the search path has an unspecified site, the information search device searches for the target node based on a sequence of appearance of elements in the search path and a number of elements that can be inserted into the unspecified site.

* * * * *